(12) United States Patent
Hasegawa

(10) Patent No.: US 12,169,617 B2
(45) Date of Patent: Dec. 17, 2024

(54) CONDUCTIVE MEMBER WITH MESH PATTERN FOR TOUCH PANEL AND TOUCH PANEL

(71) Applicant: FUJIFILM Corporation, Tokyo (JP)

(72) Inventor: Kazuhiro Hasegawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/069,032

(22) Filed: Dec. 20, 2022

(65) Prior Publication Data

US 2023/0123926 A1 Apr. 20, 2023

Related U.S. Application Data

(63) Continuation of application No. PCT/JP2021/026055, filed on Jul. 12, 2021.

(30) Foreign Application Priority Data

Aug. 27, 2020 (JP) .................................. 2020-143351

(51) Int. Cl.
 *G06F 3/044* (2006.01)
(52) U.S. Cl.
 CPC .......... *G06F 3/0446* (2019.05); *G06F 3/0445* (2019.05); *G06F 2203/04112* (2013.01)
(58) Field of Classification Search
 CPC . G06F 3/041–0412; G06F 3/044–0448; G06F 2203/04103; G06F 2203/04111–04112
 See application file for complete search history.

(56) References Cited

U.S. PATENT DOCUMENTS 11,604,552 B1\* 3/2023 Chen .................... G06F 3/0412
2014/0184936 A1\* 7/2014 Oh .................... G02F 1/133707
349/12

(Continued)

FOREIGN PATENT DOCUMENTS

JP 2015-191647 A 11/2015
JP 2016-051206 A 4/2016

(Continued)

OTHER PUBLICATIONS

International Search Report issued in PCT/JP2021/026055 on Sep. 14, 2021.

(Continued)

*Primary Examiner* — Keith L Crawley
(74) *Attorney, Agent, or Firm* — Edwards Neils LLC; Jean C. Edwards, Esq.

(57) ABSTRACT

A conductive member for a touch panel includes a transparent insulating substrate and a conductive layer that is disposed on at least one surface of the transparent insulating substrate, in which the conductive layer has a mesh pattern that includes a plurality of irregular mesh cells consisting of a modified rhombus in a plan view and is formed of a plurality of fine metal wires, the plurality of fine metal wires include at least one pair of fine metal wires that extend such that an acute angle of the modified rhombus is interposed between the fine metal wires, and at least one fine metal wire among the pair of fine metal wires has a bending portion that is bent to an inner side of the acute angle toward an intersection portion where the pair of fine metal wires intersect each other.

11 Claims, 6 Drawing Sheets

(56) References Cited

U.S. PATENT DOCUMENTS

| | | | |
|---|---|---|---|
| 2014/0293154 A1* | 10/2014 | Philipp | G02F 1/134309 |
| | | | 349/12 |
| 2015/0022736 A1* | 1/2015 | Kim | H05K 1/0296 |
| | | | 349/12 |
| 2015/0070292 A1* | 3/2015 | Saran | G06F 3/0445 |
| | | | 345/174 |
| 2015/0331526 A1* | 11/2015 | Hashida | G06F 3/0445 |
| | | | 345/174 |
| 2016/0147336 A1* | 5/2016 | Han | H05K 1/0296 |
| | | | 345/174 |
| 2016/0274702 A1* | 9/2016 | Satou | G06F 3/0446 |
| 2017/0221195 A1* | 8/2017 | Iwami | G06F 3/044 |
| 2018/0059845 A1* | 3/2018 | Tada | G06F 3/0412 |
| 2018/0107304 A1 | 4/2018 | Hara et al. | |
| 2019/0204957 A1* | 7/2019 | Nakagome | G06F 3/0412 |
| 2020/0301545 A1* | 9/2020 | Yang | G06F 3/0446 |

FOREIGN PATENT DOCUMENTS

| | | |
|---|---|---|
| JP | 2017-084153 A | 5/2017 |
| JP | 2018-195020 A | 12/2018 |
| WO | 2017/018051 A1 | 2/2017 |

OTHER PUBLICATIONS

Written Opinion issued in PCT/JP2021/026055 on Sep. 14, 2021.
International Preliminary Report on Patentability completed by WIPO on Feb. 28, 2023 in connection with International Patent Application No. PCT/JP2021/026055.
Office Action, issued by the Japanese Patent Office on Nov. 14, 2023, in connection with Japanese Patent Application No. 2022-545514.

* cited by examiner

CONDUCTIVE MEMBER WITH MESH PATTERN FOR TOUCH PANEL AND TOUCH PANEL

CROSS-REFERENCE TO RELATED APPLICATIONS

This application is a Continuation of PCT International Application No. PCT/JP2021/026055 filed on Jul. 12, 2021, which was published under PCT Article 21(2) in Japanese, and which claims priority under 35 U.S.C § 119(a) to Japanese Patent Application No. 2020-143351 filed on Aug. 27, 2020. The above applications are hereby expressly incorporated by reference, in their entirety, into the present application.

BACKGROUND OF THE INVENTION

1. Field of the Invention

The present invention relates to a conductive member for a touch panel that is used as a touch sensor or an electrode of a touch panel.

In addition, the present invention also relates to a touch panel including the conductive member for a touch panel.

2. Description of the Related Art

Recently, in various electronic apparatuses including a portable information apparatus such as a tablet computer or a smartphone, a touch panel that is used in combination with a display device such as a liquid crystal display device and performs an input operation into an electronic apparatus by allowing a finger, a stylus pen, or the like to contact or approach a screen has been widely used.

In the touch panel, a conductive member on which a detection unit for detecting a touch operation that is performed through contact or approach of a finger, a stylus pen, or the like is formed on a transparent insulating substrate is used.

The detection unit is formed of a transparent conductive oxide such as indium tin oxide (ITO) but may be formed of an opaque conductive material such as a metal other than the transparent conductive oxide. From the viewpoints of easier patterning, excellent bending properties, lower resistance, and the like as compared to the transparent conductive oxide, a conductive material such as copper or silver is used as the opaque conductive material such as a metal in the touch panel or the like.

For example, JP2015-191647A discloses a touch panel formed of an opaque conductive material. The touch panel disclosed in JP2015-191647A includes a mesh-like conductor having a plurality of irregular quadrangular opening portions.

SUMMARY OF THE INVENTION

According to the invention disclosed in JP2015-191647A, the plurality of opening portions of the mesh-like conductor have an irregular quadrangular shape. Therefore, in a case where the touch panel is disposed on a liquid crystal display or the like for displaying an image to be used as an image display apparatus, an effect of making moire generated by interference between the plurality of opening portions and a pixel pattern of the liquid crystal display or the like inconspicuous is expected. However, in the touch panel disclosed in JP2015-191647A, the plurality of opening portions have an acute-angled corner portion, and the acute-angled corner portion is conspicuous. An observer who sees the touch panel disclosed in JP2015-191647A may feel grainy.

The present invention has been made in order to solve the above-described problems of the related art, and an object thereof is to provide a conductive member for a touch panel that can reduce graininess while suppressing the occurrence of moire for use in an image display apparatus.

In addition, another object of the present invention is to provide a touch panel including the conductive member for a touch panel.

According to one aspect of the present invention, there is provided a conductive member for a touch panel, the conductive member comprising: a transparent insulating substrate; and a conductive layer that is disposed on at least one surface of the transparent insulating substrate, in which the conductive layer has a mesh pattern that includes a plurality of irregular mesh cells consisting of a modified rhombus in a plan view and is formed of a plurality of fine metal wires, the plurality of fine metal wires include at least one pair of fine metal wires that extend such that an acute angle of the modified rhombus is interposed between the fine metal wires, and at least one fine metal wire among the pair of fine metal wires has a bending portion that is bent to an inner side of the acute angle toward an intersection portion where the pair of fine metal wires intersect each other.

It is preferable that the modified rhombus has a shape where at least one vertex of a regular rhombic reference mesh cell is randomly redisposed or a shape where an interval between at least one pair of parallel sides of a regular rhombic reference mesh cell is randomly changed, and has an irregularity of 2% or more and 10% or less with respect to the reference mesh cell.

It is preferable that an intersecting angle between the pair of fine metal wires in the intersection portion is a right angle.

It is preferable that a starting point of bending in the bending portion is positioned at a distance of less than $\frac{1}{10}$ a length of a corresponding side of the modified rhombus from the intersection portion.

The bending portion may have a linear shape or a curved shape.

The pair of fine metal wires may be disposed on the same surface and may be electrically connected to each other in the intersection portion.

The pair of fine metal wires may be disposed on the different surfaces and may be electrically insulated from each other in the intersection portion.

In this case, the conductive layer may include a first conductive layer and a second conductive layer, the first conductive layer being disposed on one surface of the transparent insulating substrate, and the second conductive layer being disposed on the first conductive layer with an insulating layer interposed between the second conductive layer and the first conductive layer, and among the pair of fine metal wires, one fine metal wire may be disposed on the first conductive layer and the other fine metal wire may be disposed on the second conductive layer.

Alternatively, the conductive layer may include a first conductive layer and a second conductive layer, the first conductive layer being disposed on one surface of the transparent insulating substrate, and the second conductive layer being disposed on another surface of the transparent insulating substrate, and among the pair of fine metal wires, one fine metal wire may be disposed on the first conductive layer and the other fine metal wire may be disposed on the second conductive layer.

It is preferable that a line width of the fine metal wire is 1 μm or more and 3 μm or less.

According to another aspect of the present invention, there is provided a touch panel including the above-described conductive member for a touch panel.

According to the aspects of the present invention, a conductive layer has a mesh pattern that includes a plurality of irregular mesh cells consisting of a modified rhombus in a plan view and is formed of a plurality of fine metal wires, the plurality of fine metal wires include at least one pair of fine metal wires that extend such that an acute angle of the modified rhombus is interposed between the fine metal wires, and at least one fine metal wire among the pair of fine metal wires has a bending portion that is bent to an inner side of the acute angle toward an intersection portion where the pair of fine metal wires intersect each other. Therefore, the graininess can be reduced while suppressing the occurrence of moire for use in an image display apparatus.

DESCRIPTION OF THE PREFERRED EMBODIMENTS

Hereinafter, a conductive member for a touch panel and a touch panel according to the present invention will be described in detail based on a preferable embodiment shown in the accompanying drawings.

In the following description, a numerical range indicated by the expression "to" includes numerical values described on both sides. For example, in a case where "s is a numerical value t1 to a numerical value t2", the range s is a range including the numerical value t1 and the numerical value t2, which is expressed by a mathematical symbol $t1 \leq s \leq t2$.

Unless specified otherwise, the meaning of an angle such as "perpendicular" or "parallel" includes a case where an error range is generally allowable in the technical field.

"Transparent" represents that a light transmittance in a visible wavelength range of 400 to 800 nm is at least 40% or more, preferably 75% or more, more preferably 80% or more, and still more preferably 90% or more. The light transmittance is measured using "Plastics—Determination of Total Luminous Transmittance And Reflectance" defined by JIS K 7375:2008.

First Embodiment

Figure 1:
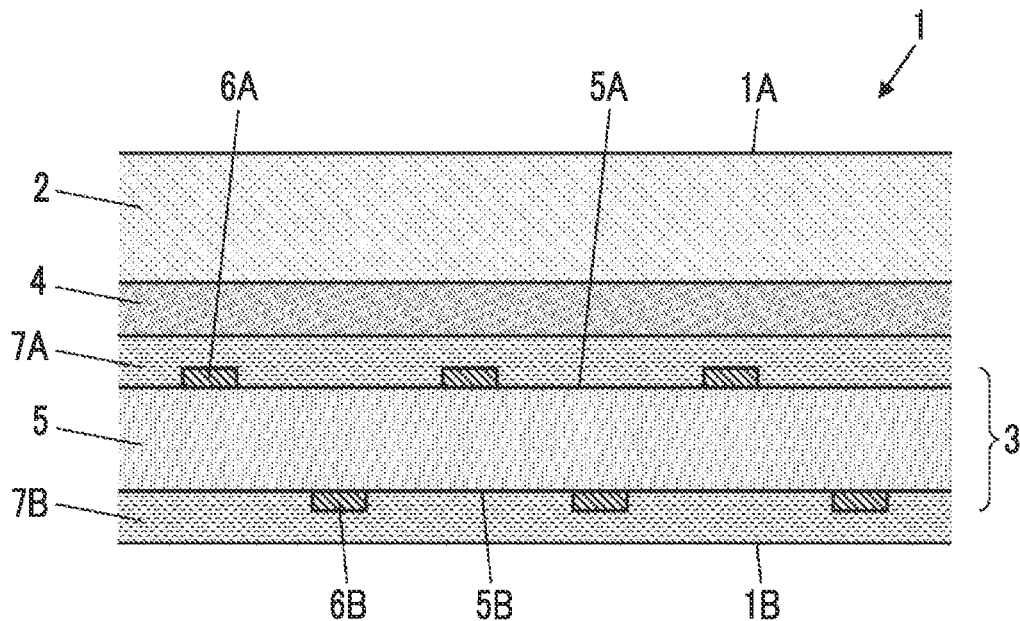
FIG. 1 is a partial cross-sectional view showing a touch panel according to a first embodiment of the present invention.

FIG. 1 shows a configuration of a touch panel 1 according to a first embodiment of the present invention.

The touch panel 1 includes a front surface 1A and a back surface 1B, and is used in a state where a display module (not shown) including a liquid crystal display is disposed on the back surface 1B side. The front surface 1A of the touch panel 1 is a touch detection surface and is a visible side where an operator of the touch panel 1 observes an image displayed on a display module through the touch panel 1.

The touch panel 1 includes a transparent insulating cover panel 2 that is disposed on the front surface 1A side, and a conductive member for a touch panel 3 is bonded to a surface of the cover panel 2 opposite to the front surface 1A using a transparent adhesive 4.

The conductive member for a touch panel 3 includes: the transparent insulating substrate 5; a first conductive layer 6A that is formed and patterned on a first surface 5A of the transparent insulating substrate 5; and a second conductive layer 6B that is formed and patterned on a second surface 5B of the transparent insulating substrate 5. In addition, as shown in FIG. 1, in order to protect or planarize the patterned first conductive layer 6A, a transparent insulating member 7A may be disposed to cover the first conductive layer 6A. In addition, in order to protect or planarize the patterned second conductive layer 6B, a transparent insulating member 7B may be disposed to cover the second conductive layer 6B.

Figure 2:
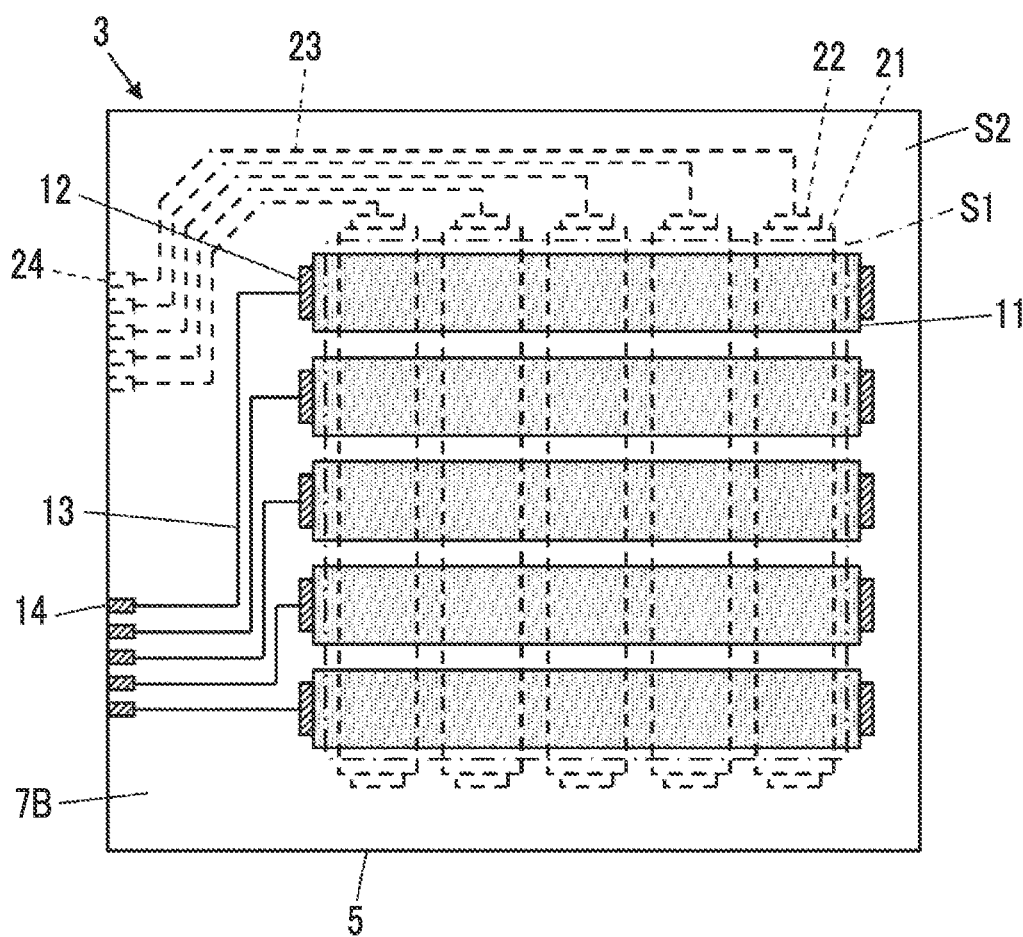
FIG. 2 is a plan view showing a conductive member for a touch panel according to the first embodiment.

FIG. 2 is a plan view showing the conductive member for a touch panel 3. The conductive member for a touch panel 3 is divided into: a transmission region S1 for detecting a touch operation by a finger, a stylus pen, or the like; and a peripheral region S2 that is a region outside of the transmission region S1 and is provided for disposing peripheral wires and the like through which the conductive member for a touch panel 3 is connected to a display module (not shown).

In the first conductive layer 6A and the second conductive layer 6B, the electrodes for detecting the touch operation and the peripheral wires for connection to the electrodes are patterned. Among the first conductive layer 6A and the second conductive layer 6B, in the first conductive layer 6A that is positioned on the cover panel 2 side, that is, the visible side, a plurality of first electrodes 11 extend in a given direction and are arranged at intervals in a direction perpendicular to the extending direction. Each of the plurality of first electrodes 11 includes a first pad 12 at an end part.

In addition, the first conductive layer 6A includes: a plurality of first peripheral wires 13 led out from the plurality of first pads 12 of the plurality of first electrodes 11; and a plurality of first external connection terminals 14 that are connected to the plurality of first peripheral wires 13, respectively.

In the second conductive layer 6B that is positioned on the back surface 1B side of the touch panel 1, a plurality of second electrodes 21 extend in a direction perpendicular to the direction in which the plurality of first electrodes 11 extend and are arranged at intervals in a direction perpendicular to the extending direction of the second electrodes 21, that is, in the direction in which the plurality of first electrodes 11 extend. Each of the plurality of second electrodes 21 includes a second pad 22 at an end part.

In addition, the second conductive layer 6B includes: a plurality of second peripheral wires 23 led out from the plurality of second pads 22 of the plurality of second electrodes 21; and a plurality of second external connection terminals 24 that are connected to the plurality of second peripheral wires 23, respectively.

Here, the plurality of first electrodes 11 of the first conductive layer 6A and the plurality of second electrodes 21 of the second conductive layer 6B are disposed in the transmission region S1 divided from the conductive member for a touch panel 3.

In addition, the plurality of first pads 12, the plurality of first peripheral wires 13, and the plurality of first external connection terminals 14 of the first conductive layer 6A and the plurality of second pads 22, the plurality of second peripheral wires 23, and the plurality of second external connection terminals 24 of the second conductive layer 6B are disposed in the peripheral region S2 divided from the conductive member for a touch panel 3.

Figure 3:
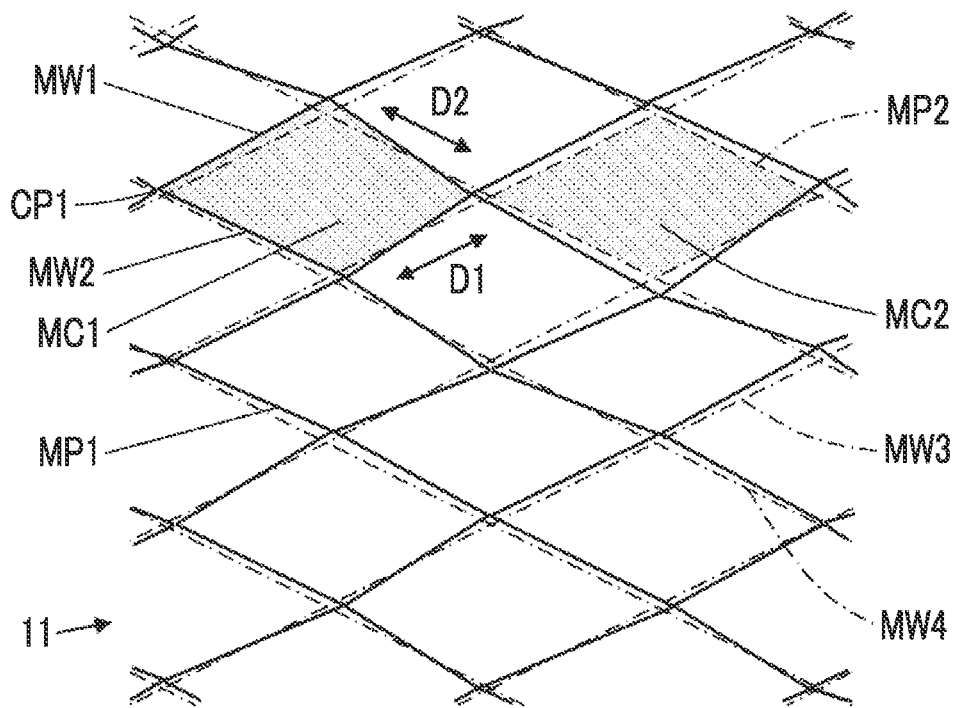
FIG. 3 is a partially enlarged plan view showing a first electrode according to the first embodiment.

FIG. 3 is a partially enlarged plan view showing the first electrode 11.

The first electrode 11 includes: a plurality of fine metal wires MW1 that are bent and extend substantially in a first direction D1 in a plan view; and a plurality of fine metal wires MW2 that are bent and extend substantially in a second direction D2 in a plan view. The first direction D1 and the second direction D2 intersect each other. In addition, the plurality of fine metal wires MW1 and the plurality of fine metal wires MW2 intersect each other to be electrically connected on the same surface such that a plurality of intersection portions CP1 where the fine metal wires MW1 and the fine metal wires MW2 intersect each other are formed.

In addition, the plurality of fine metal wires MW1 and the plurality of fine metal wires MW2 intersect each other this way such that a plurality of quadrangular irregular mesh cells MC1 are formed, and a mesh pattern MP1 is formed of the plurality of irregular mesh cells MC1. As indicated by a dotted line in FIG. 3, the mesh pattern MP1 is obtained by randomly redisposing positions of intersection portions between a plurality of fine metal wires MW3 and a plurality of fine metal wires MW4 in a given range relative to a regular reference mesh pattern MP2 including a plurality of rhombic reference mesh cells MC2, the plurality of fine metal wires MW3 extending linearly in the first direction D1, the plurality of fine metal wires MW4 extending linearly in the second direction D2, and the plurality of rhombic reference mesh cells MC2 being formed by the fine metal wires MW3 and the fine metal wires MW4.

As the method of randomly redisposing the positions of the intersection portions between the plurality of fine metal wires MW3 and the plurality of fine metal wires MW4, a method of randomly disposing a new vertex in a circle around at least one vertex of the intersection portion of the reference mesh pattern, that is, the regular rhombic reference mesh cell MC2 can be used. In order to suppress moire recognized in a case where the touch panel 1 is disposed on a display module (not shown) for displaying an image, it is preferable that a radius of the circle has a length that is more than or equal to $\frac{1}{50}$ a length of one side of the reference mesh cell MC2. However, in a case where an irregularity of the irregular mesh cell MC1 with respect to the rhombic reference mesh cell MC2 is excessively large, density unevenness recognized in a case where the touch panel 1 is disposed on the display module increases. Therefore, the radius of the circle has a length that is preferably less than $\frac{1}{10}$ and more preferably $\frac{1}{20}$ a length of one side of the rhombic reference mesh cell MC2.

Here, in a case where the positions of the intersection portions between the plurality of fine metal wires MW3 and the plurality of fine metal wires MW4 are randomly redisposed using the method of randomly disposing a new vertex in the circle around the vertex of rhombic reference mesh cell MC2, the irregularity [%] of the irregular mesh cell MC1 with respect to the rhombic reference mesh cell MC2 can be represented by Expression (1).

(Irregularity)=(Radius of Circle used for Redisposing Intersection Portions)/(Length of One Side of Rhombic Reference Mesh Cell MC2)×100  (1)

Accordingly, the irregularity is preferably 2% or more and 10% or less and more preferably 2% or more and 5% or less.

This way, the irregular mesh cell MC1 has a shape obtained by modifying a rhombus.

Here, all of the irregular mesh cells MC1 obtained by connecting the plurality of intersection portions CP1 using a straight line can be called modified rhombuses as long as the length of each of the sides is within 20% with respect to the average value of four sides. In addition, the regular reference mesh cell MC2 can be restored by obtaining the average value of the lengths of the sides of 100 irregular mesh cells MC1 adjacent to each other with respect to any intersection portion CP1 and the average value of inner angles facing the same direction.

From the viewpoint of suppressing moire, an acute angle of the rhombic reference mesh cells MC2 forming the regular reference mesh pattern MP2 is preferably 55 degrees to 85 degrees, more preferably 60 degrees to 80 degrees, and most preferably 65 degrees to 75 degrees.

Figure 4:
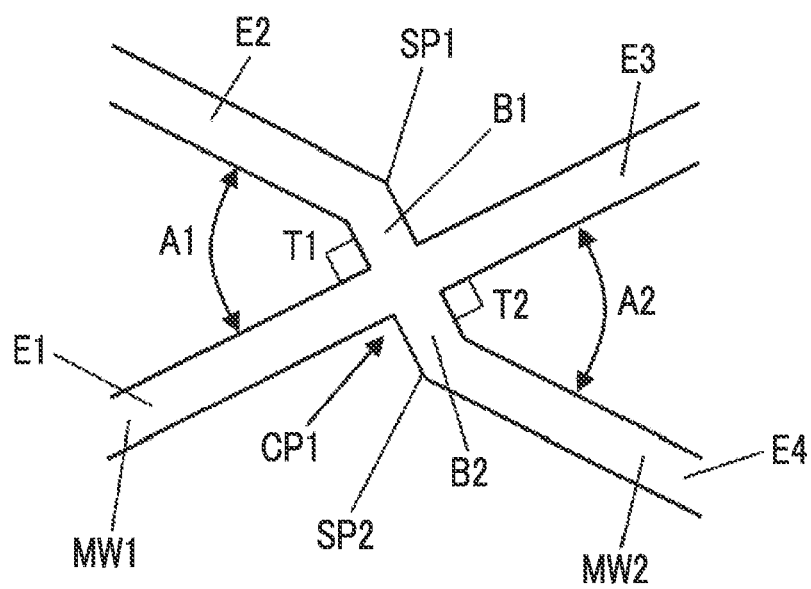
FIG. 4 is a partially enlarged plan view showing an intersection portion of the first electrode according to the first embodiment.

FIG. 4 is a partially enlarged plan view showing the intersection portion CP1 between the fine metal wire MW1 and the fine metal wire MW2.

With respect to the intersection portion CP1, four fine metal wires including a first fine metal wire E1, a second fine metal wire E2, a third fine metal wire E3, and a fourth fine metal wire E4 extend. The first fine metal wire E1 and the third fine metal wire E3 are a part of the fine metal wire MW1, and the second fine metal wire E2 and the fourth fine metal wire E4 are a part of the fine metal wire MW2.

Each of the first fine metal wire E1 and the second fine metal wire E2 has a linear shape extending substantially along the side of the mesh cells MC1 and extends such that an acute angle A1 is interposed between the first fine metal wire E1 and the second fine metal wire E2.

The second fine metal wire E2 has a bending portion B1 that is bent to an inner side of the acute angle A1 from a starting point SP1 of bending toward the intersection portion CP1. The bending portion B1 has a linear shape and intersects the first fine metal wire E1 at an intersecting angle T1 that is more than the acute angle A1.

From the viewpoint of preventing the bending portion B1 from being conspicuous, it is preferable that the starting point SP1 of bending in the bending portion B1 is positioned at a distance of less than 1/10 a length of a corresponding side of the modified rhombus, that is, the length of the second fine metal wire E2 from the intersection portion CP1.

In addition, each of the third fine metal wire E3 and the fourth fine metal wire E4 has a linear shape extending substantially along the side of the mesh cells MC1 and extends such that an acute angle A2 is interposed between the third fine metal wire E3 and the fourth fine metal wire E4.

The fourth fine metal wire E4 has a bending portion B2 that is bent to an inner side of the acute angle A2 from a starting point SP2 of bending toward the intersection portion CP1. The bending portion B2 has a linear shape and intersects the third fine metal wire E3 at an intersecting angle T2 that is more than the acute angle A2.

From the viewpoint of preventing the bending portion B2 from being conspicuous, it is preferable that the starting point SP2 of bending in the bending portion B2 is positioned at a distance of less than 1/10 a length of a corresponding side of the rhombus, that is, the length of the fourth fine metal wire E4 from the intersection portion CP1.

Here, in a case where the second fine metal wire E2 does not have the bending portion B1 and the fourth fine metal wire E4 does not have the bending portion B2, the first fine metal wire E1 and the second fine metal wire E2 intersect each other at the acute angle A1, and the third fine metal wire E3 and the fourth fine metal wire E4 intersect each other at the acute angle A2. Further, the second fine metal wire E2 and the third fine metal wire E3 intersect each other at an obtuse angle, and the first fine metal wire E1 and the fourth fine metal wire E4 intersect each other at an obtuse angle.

Therefore, in this case, a corner portion having an acute angle interposed between the first fine metal wire E1 and the second fine metal wire E2 and a corner portion having an acute angle interposed between the third fine metal wire E3 and the fourth fine metal wire E4 are more conspicuous than a corner portion having an obtuse angle interposed between the second fine metal wire E2 and the third fine metal wire E3 and a corner portion having an obtuse angle interposed between the first fine metal wire E1 and the fourth fine metal wire E4. As a result, in a case where the second fine metal wire E2 does not have the bending portion B1 and the fourth fine metal wire E4 does not have the bending portion B2, conspicuous portions are scattered. Therefore, an observer who sees the first electrode 11 may feel grainy.

In the first electrode 11 according to the first embodiment of the present invention, the second fine metal wire E2 has the bending portion B1 where the second fine metal wire E2 intersects the first fine metal wire E1 at the intersecting angle T1 that is more than the acute angle A1, and the fourth fine metal wire E4 has the bending portion B2 where the fourth fine metal wire E4 intersects the third fine metal wire E3 at the intersecting angle T2 that is more than the acute angle A2. Therefore, the corner portion where the first fine metal wire E1 and the second fine metal wire E2 intersect each other at the acute angle A1 and the corner portion where the third fine metal wire E3 and the fourth fine metal wire E4 intersect each other at the acute angle A2 are not present, and the graininess is reduced.

In addition, for example, a case in which the fine metal wires MW1 and MW2 are formed by photolithography and etching and the mesh pattern MP1 is patterned can be considered.

In a case where the second fine metal wire E2 does not have the bending portion B1 and the fourth fine metal wire E4 does not have the bending portion B2, in the vicinity of the intersection portion CP1, a gap between the first fine metal wire E1 and the second fine metal wire E2 and a gap between the third fine metal wire E3 and the fourth fine metal wire E4 are narrower than a gap between the second fine metal wire E2 and the third fine metal wire E3 and a gap between the first fine metal wire E1 and the fourth fine metal wire E4.

In a case where photolithography and etching are performed to form the pattern, in the corner portion having an acute angle interposed between the first fine metal wire E1 and the second fine metal wire E2, the conductive material forming the first fine metal wire E1 and the second fine metal wire E2 may remain due to insufficient etching. In addition, in the corner portion having an acute angle interposed between the third fine metal wire E3 and the fourth fine metal wire E4, likewise, the conductive material forming the third fine metal wire E3 and the fourth fine metal wire E4 may remain. As a result, the intersection portion CP1 may be thicker than an intersection portion in an originally designed pattern.

In the first electrode 11 according to the first embodiment of the present invention, the second fine metal wire E2 has the bending portion B1 where the second fine metal wire E2 intersects the first fine metal wire E1 at the intersecting angle T1 that is more than the acute angle A1, and the fourth fine metal wire E4 has the bending portion B2 where the fourth fine metal wire E4 intersects the third fine metal wire E3 at the intersecting angle T2 that is more than the acute angle A2. Therefore, even in a case where the mesh pattern MP1 is patterned using the method of photolithography, the intersection portion CP1 can be suppressed from being patterned to be thicker than the original design.

Here, from the viewpoint of reducing the graininess and the viewpoint of suppressing the intersection portion CP1 from being patterned to be thicker than the original design during the photolithography, it is preferable that each of the intersecting angle T1 between the bending portion B1 and the first fine metal wire E1 and the intersecting angle T2 between the bending portion B2 and the third fine metal wire E3 is a right angle. In the present invention, the right angle refers to an angle in a given angle range including 90 degrees. For example, the right angle refers to an angle in an angle range of 85 degrees or more and 90 degrees or less.

In addition, a ratio of the number of the intersection portions CP1 formed in the bending portions B1 and B2 with respect to the number of all of the intersection portion CP1 in the conductive member for a touch panel 3 is preferably 80% or more, more preferably 90% or more, and still more preferably 100%. In a case where the ratio is less than 80%, the graininess is likely to be observed.

As in the first electrode 11, the second electrode 21 is formed of the fine metal wires MW1 and MW2 and has the mesh pattern MP1 formed of the irregular mesh cells MC1 consisting of the modified rhombus shown in FIG. 3. In addition, even in the second electrode 21, as in the first electrode 11, the first fine metal wire E1 to the fourth fine metal wire E4 extend with respect to the intersection portion CP1 of the fine metal wires MW1 and MW2 in the second electrode 21 as shown in FIG. 4. The second fine metal wire E2 has the bending portion B1 that is bent to an inner side of the acute angle A1, and the fourth fine metal wire E4 has the bending portion B2 that is bent to an inner side of the acute angle A2.

Therefore, in the second electrode 21, as in the first electrode 11, the graininess that the observer feels in a case where the observer sees the second electrode 21 can be reduced, and the intersection portion CP1 can be suppressed from being patterned to be thicker than the original design during the photolithography.

Figure 5:
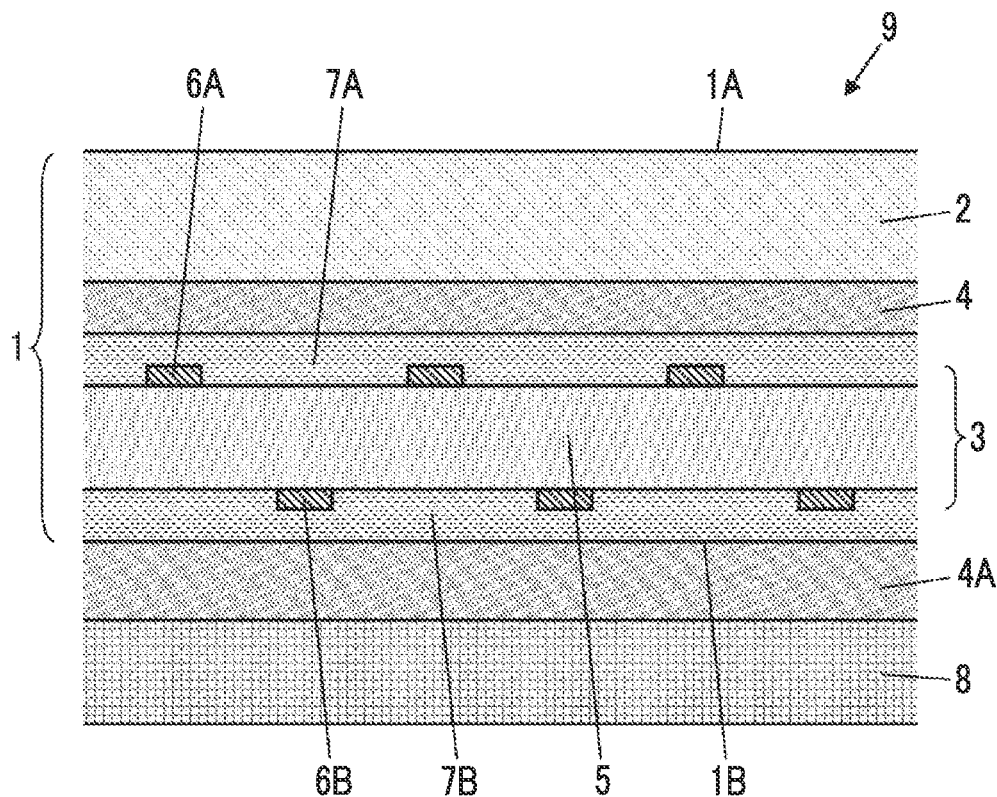
FIG. 5 is a partial cross-sectional view showing an image display apparatus including the touch panel according to the first embodiment.

Here, for example, by disposing the touch panel 1 including the conductive member for a touch panel 3 according to the first embodiment on a display module 8 for displaying an image as shown in FIG. 5, an image display apparatus 9 is formed. In FIG. 5, the display module 8 is bonded to the back surface 1B of the touch panel 1 using a transparent adhesive 4A. In addition, although not shown in detail, the display module 8 includes: a display screen such as a liquid crystal display; and a controller for controlling the display or the like of an image on a display screen. An operator of the image display apparatus 9 recognizes the image displayed by the display module 8 through the touch panel 1, and performs a touch operation through the touch panel 1 based on the recognized image.

In general, in the image display apparatus, moire may be generated by interference between a pixel pattern of the display module and a mesh pattern that is formed by fine metal wires forming a sensor of the touch panel. In particular, in a case where the mesh pattern is formed by regularly arranging mesh cells having a given shape, the mesh pattern and the pixel pattern of the display module are likely to interfere, and moire is likely to be generated.

In addition, in a case where the mesh pattern is patterned by photolithography, the intersection portion between the fine metal wires in the mesh pattern may be patterned to be thicker than the original design. In this case, local unevenness in light transmittance occurs in the mesh pattern. Therefore, in the image on the display module recognized through the touch panel, density unevenness may occur.

The first electrode 11 and the second electrode 21 according to the first embodiment have the mesh pattern MP1 that is formed by the plurality of irregular mesh cells MC1 consisting of the modified rhombus. Therefore, interference with the pixel pattern of the display module 8 is not likely to occur, and the occurrence of moire is suppressed.

In addition, in a case where the mesh pattern MP1 in the first electrode 11 and the second electrode 21 is patterned by photolithography, the plurality of intersection portions CP1 in the mesh pattern MP1 are suppressed from being patterned to be thicker than the original design. Therefore, in the image on the display module 8 recognized through the touch panel 1, density unevenness is also suppressed.

As described above, in the conductive member for a touch panel 3 according to the embodiment of the present invention, the first electrode 11 and the second electrode 21 are formed by the fine metal wires MW1 and MW2, and have the mesh pattern MP1 formed of the plurality of irregular mesh cells MC1 consisting of the modified rhombus. Further, the second fine metal wire E2 extending from the intersection portion CP1 between the fine metal wires MW1 and MW2 has the bending portion B1, and the fourth fine metal wire E4 has the bending portion B2. Therefore, in a case where the conductive member for a touch panel 3 is used for the image display apparatus 9, the graininess can be reduced while suppressing the occurrence of moire.

In addition, in a case where the mesh pattern MP1 in the first electrode 11 and the second electrode 21 is patterned by photolithography, the intersection portions CP1 in the mesh pattern MP1 are suppressed from being patterned to be thicker than the original design. In a case where the touch panel 1 including the conductive member for a touch panel 3 is used for the image display apparatus 9, density unevenness is also suppressed in the image on the display module 8 recognized through the touch panel 1.

Between the plurality of first electrodes 11 in the transmission region S1 shown in FIG. 2, dummy electrodes (not shown) that are electrically connected to the plurality of first electrodes 11 and are insulated from peripheral circuits may also be provided. In addition, between the plurality of second electrodes 21 in the transmission region S1, dummy electrodes (not shown) that are electrically connected to the plurality of second electrodes 21 and are insulated from peripheral circuits may also be provided. The dummy electrodes may consist of the fine metal wires MW1 and MW2 forming the first electrode 11 and the second electrode 21 and may have the same pattern as the mesh pattern MP1. A fracture portion at each of a position between the first electrode 11 and the dummy electrode and a position between the second electrode 21 and the dummy electrode, and the width of the fracture portion is preferably in a range of 5 µm to 50 µm. As a result, the first electrode 11 and the dummy electrode are electrically insulated from each other, and the second electrode 21 and the dummy electrode are electrically insulated from each other. In addition, in order to improve electrical insulating properties of the dummy electrodes from the peripheral circuits, additional fracture portions may be formed in the dummy electrodes.

From the viewpoints of preventing the fine metal wires MW1 and MW2 from being conspicuous, maintaining the electric resistance of the first electrode 11 and the second electrode 21 at low values, and improving the detection sensitivity for the touch operation, it is preferable that the fine metal wires MW1 and MW2 forming the first electrode 11 and the second electrode 21 have a line width of 1 µm or more and 3 µm or less.

In addition, it is preferable that the touch panel 1 has a given light transmittance or more such that an image displayed on the display module 8 is clearly recognized in a case where the touch panel 1 is disposed on the display module 8 to be used as the image display apparatus 9. From the viewpoint, it is preferable that an opening ratio of the mesh pattern MP1 in the first electrode 11 and the second electrode 21 is 95% to 99%. Here, the opening ratio of the mesh pattern MP1 is defined as a ratio of the area of a region where the fine metal wires MW1 and MW2 are not present to the unit area of the mesh pattern MP1.

In addition, instead of the configuration where the second fine metal wire E2 has the bending portion B1 and the fourth fine metal wire E4 has the bending portion B2, each of the first fine metal wire E1 and the third fine metal wire E3 may have a bending portion.

Figure 6:
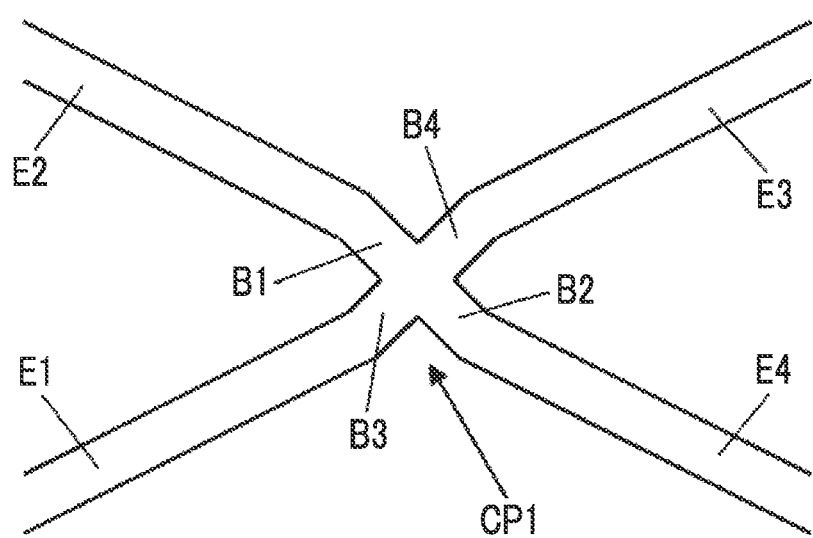
FIG. 6 is a partially enlarged plan view showing an intersection portion of a first electrode according to a modification example of the first embodiment.

Further, as shown in FIG. 6, a configuration in which the first fine metal wire E1 has a bending portion B3, the second fine metal wire E2 has the bending portion B1, the third fine metal wire E3 has a bending portion B4, and the fourth fine metal wire E4 has the bending portion B2 can also be adopted.

This way, as in the first fine metal wire E1 to the fourth fine metal wire E4, the plurality of fine metal wires MW1 and MW2 of the first electrode 11 and the second electrode 21 include at least one pair of fine metal wires that extend such that an acute angle of the modified rhombus is interposed between the fine metal wires, and at least one fine metal wire among the pair of fine metal wires has a bending portion, that is, all or a part of the first fine metal wire E1 to the fourth fine metal wire E4 have the bending portions B1 to B4. As a result, in a case where the touch panel 1 including the conductive member for a touch panel 3 is used for the image display apparatus 9, the occurrence of moire is suppressed, and the graininess is also reduced.

Second Embodiment

In the first embodiment, the bending portions B1 and B2 have a linear shape but may have a curved shape.

Figure 7:
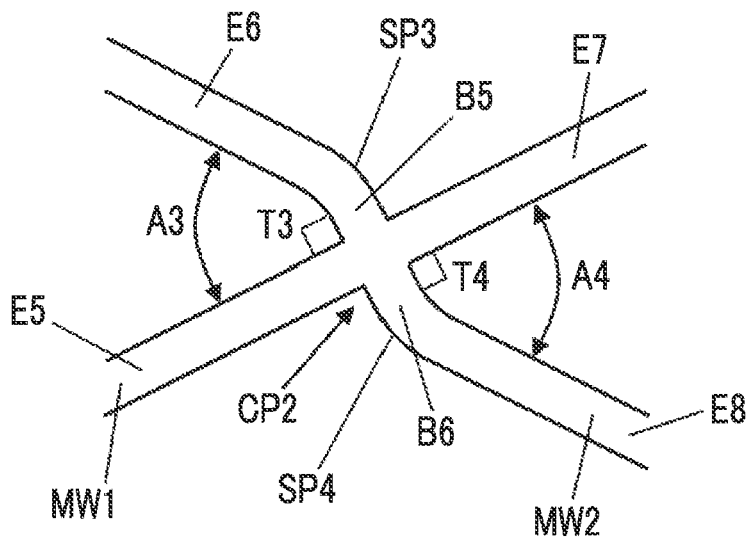
FIG. 7 is a partially enlarged plan view showing an intersection portion of a first electrode according to a second embodiment.

FIG. 7 shows an intersection portion CP2 between the fine metal wires MW1 and MW2 according to a second embodiment.

A first fine metal wire E5, a second fine metal wire E6, a third fine metal wire E7, and a fourth fine metal wire E8 extend from the intersection portion CP2.

Among the first fine metal wire E5 to the fourth fine metal wire E8, the second fine metal wire E6 has a bending portion B5 having a curved shape that is bent to an inner side of an acute angle A3 from a starting point SP3 of bending toward the intersection portion CP2. The bending portion B5 intersects the first fine metal wire E5 at an intersecting angle T3 that is more than the acute angle A3 interposed between the first fine metal wire E5 and the second fine metal wire E6.

In addition, the fourth fine metal wire E8 has a bending portion B6 having a curved shape that is bent to an inner side of an acute angle A4 from a starting point SP4 of bending toward the intersection portion CP2. The bending portion B6 intersects the third fine metal wire E7 at an intersecting angle T4 that is more than the acute angle A4 interposed between the third fine metal wire E7 and the fourth fine metal wire E8.

This way, even in a case where the bending portions B5 and B6 have a curved shape, in a case where the touch panel including the conductive member for a touch panel according to the second embodiment is used for the image display apparatus, the occurrence of moire can be suppressed, and the graininess can be also reduced as in the case where the bending portions B1 and B2 have a linear shape in the first embodiment.

Figure 8:
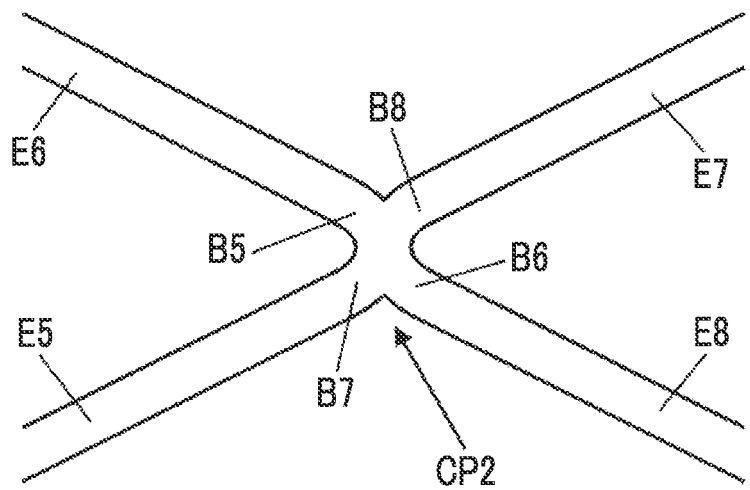
FIG. 8 is a partially enlarged plan view showing an intersection portion of a first electrode according to a modification example of the second embodiment.

In addition, the present invention is not limited to the configuration where the second fine metal wire E6 has the bending portion B5 and the fourth fine metal wire E8 has the bending portion B6. As shown in FIG. 8, a configuration in which the first fine metal wire E5 has a bending portion B7 having a curved shape, the second fine metal wire E6 has the bending portion B5 having a curved shape, the third fine metal wire E7 has a bending portion B8 having a curved shape, and the fourth fine metal wire E8 has the bending portion B6 having a curved shape can also be adopted.

Here, the bending portions B5 to B8 having a curved shape may have any curved shape as long as the fine metal wires E5 to E8 are continuously to each other in the intersection portion CP2. It is preferable that the bending portions B5 to B8 have a shape of a multidimensional curve that can be designed by calculation, and it is more preferable that the bending portions B5 to B8 have a shape of a two-dimensional curve that can be easily calculated.

Third Embodiment

In the first embodiment, in a plan view, each of the first electrode 11 and the second electrode 21 has the mesh pattern MP1. The first electrode 11 and the second electrode 21 can also overlap each other to form the mesh pattern MP1 in a plan view. In this case, for example, by causing the fine metal wire MW1 of the first electrode 11 and the fine metal wire MW2 of the second electrode 21 to overlap each other or by causing the fine metal wire MW2 of the first electrode 11 and the fine metal wire MW1 of the second electrode 21 to overlap each other, the intersection portion is formed.

Figure 9:
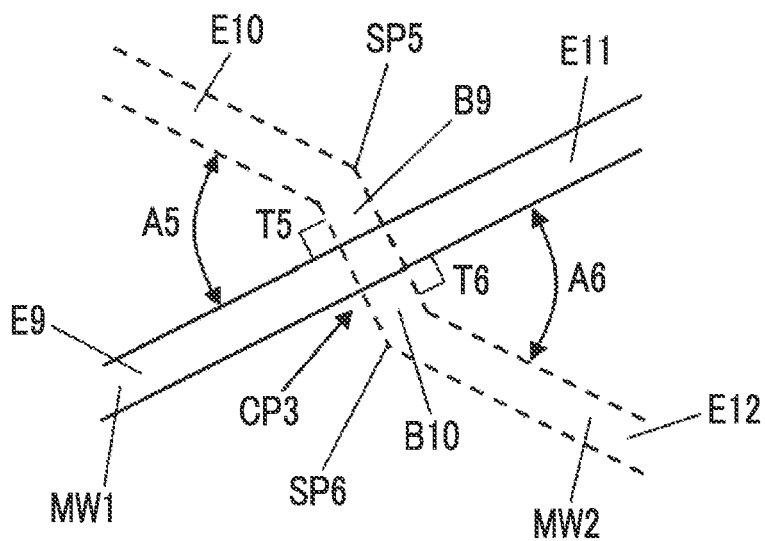
FIG. 9 is a partially enlarged plan view showing a portion where a first fine metal wire of a first electrode and a second fine metal wire of a second electrode according to a third embodiment overlap each other.

FIG. 9 shows an intersection portion CP3 between the fine metal wire MW1 of the first electrode 11 and the fine metal wire MW2 of the second electrode 21 in the third embodiment.

A first fine metal wire E9, a second fine metal wire E10, a third fine metal wire E11, and a fourth fine metal wire E12 extend from the intersection portion CP3. The first fine metal wire E9 and the third fine metal wire E11 are a part of the fine metal wire MW1 of the first electrode 11. In addition, the second fine metal wire E10 and the fourth fine metal wire E12 are a part of the second electrode 21. Therefore, the first fine metal wire E9 and the third fine metal wire E11 and the second fine metal wire E10 and the fourth fine metal wire E12 are disposed on different surfaces, and are electrically insulated from each other in the intersection portion CP3.

The second fine metal wire E10 has a bending portion B9 that is bent to an inner side of an acute angle A5 interposed between the first fine metal wire E9 and the second fine metal wire E10 from a starting point SP5 of bending toward the first fine metal wire E9. The bending portion B9 has a linear shape and intersects the first fine metal wire E9 at an intersecting angle T5 that is more than the acute angle A5.

In addition, the fourth fine metal wire E12 has a bending portion B10 that is bent to an inner side of an acute angle A6 interposed between the third fine metal wire E11 and the fourth fine metal wire E12 from a starting point SP6 of bending toward the third fine metal wire E11. The bending portion B10 has a linear shape and intersects the third fine metal wire E11 at an intersecting angle T6 that is more than the acute angle A6.

This way, even in a case where the first fine metal wire E9 and the second fine metal wire E10 are disposed on different planes and the third fine metal wire E11 and the fourth fine metal wire E12 are disposed on different planes, as in the case where the first fine metal wire E1 to the fourth fine metal wire E4 are disposed on the same surface in the first embodiment, in a case where the touch panel including the conductive member for a touch panel according to the third embodiment is used for the image display apparatus, the occurrence of moire is suppressed, and the graininess is also reduced.

Figure 10:
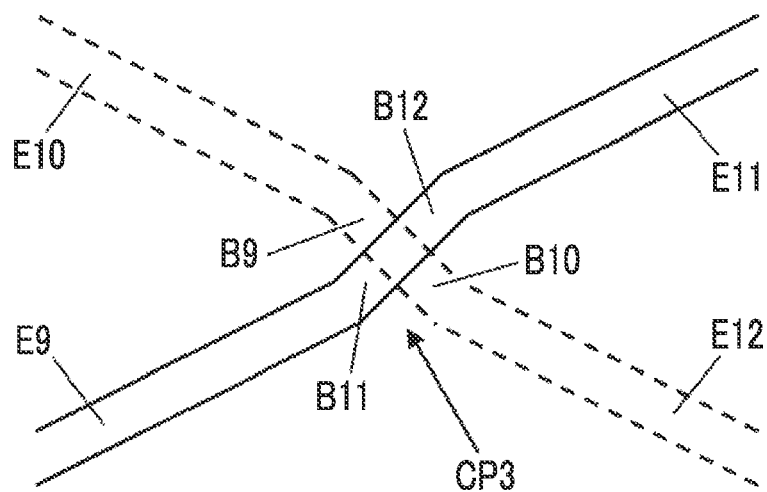
FIG. 10 is a partially enlarged plan view showing a portion where a first fine metal wire of a first electrode and a second fine metal wire of a second electrode according to a modification example of the third embodiment overlap each other.

In addition, the present invention is not limited to the configuration where the second fine metal wire E10 has the bending portion B9 and the fourth fine metal wire E12 has the bending portion B10. For example, as shown in FIG. 10, a configuration in which the first fine metal wire E9 has a bending portion B11, the second fine metal wire E10 has the bending portion B9, the third fine metal wire E11 has a bending portion B12, and the fourth fine metal wire E12 has the bending portion B10 can also be adopted.

Fourth Embodiment

The bending portions B9 and B10 have a linear shape in the third embodiment but may also have a curved shape as in the bending portions B5 and B6 in the second embodiment.

Figure 11:
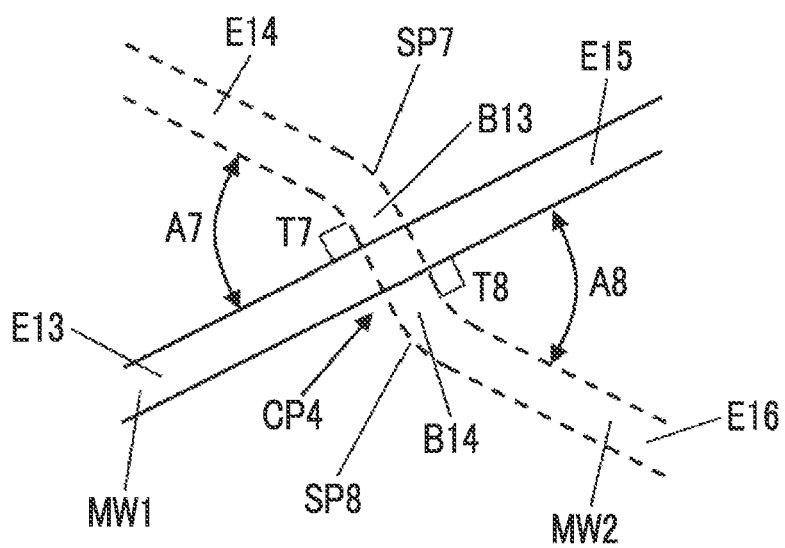
FIG. 11 is a partially enlarged plan view showing a portion where a first fine metal wire of a first electrode and a second fine metal wire of a second electrode according to a fourth embodiment overlap each other.

FIG. 11 shows an intersection portion CP4 between the fine metal wire MW1 of the first electrode 11 and the fine metal wire MW2 of the second electrode 21 in the fourth embodiment.

A first fine metal wire E13, a second fine metal wire E14, a third fine metal wire E15, and a fourth fine metal wire E16 extend from the intersection portion CP4. The first fine metal wire E13 and the third fine metal wire E15 are a part of the fine metal wire MW1 of the first electrode 11, and the second fine metal wire E14 and the fourth fine metal wire E16 are a part of the fine metal wire MW2 of the second electrode 21.

The second fine metal wire E14 has a bending portion B13 that is bent to an inner side of an acute angle A7 interposed between the first fine metal wire E13 and the second fine metal wire E14 from a starting point SP7 of bending toward the first fine metal wire E13. The bending portion B13 has a curved shape and intersects the first fine metal wire E13 at an intersecting angle T7 that is more than the acute angle A7.

In addition, the fourth fine metal wire E16 has a bending portion B14 that is bent to an inner side of an acute angle A8 interposed between the third fine metal wire E15 and the fourth fine metal wire E16 from a starting point SP8 of bending toward the third fine metal wire E15. The bending portion B14 has a curved shape and intersects the third fine metal wire E15 at an intersecting angle T8 that is more than the acute angle A8.

This way, even in a case where the bending portions B13 and B14 have a curved shape, as in the third embodiment, in a case where the touch panel including the conductive member for a touch panel according to the fourth embodiment is used for the image display apparatus, the occurrence of moire is suppressed, and the graininess is also reduced.

Figure 12:
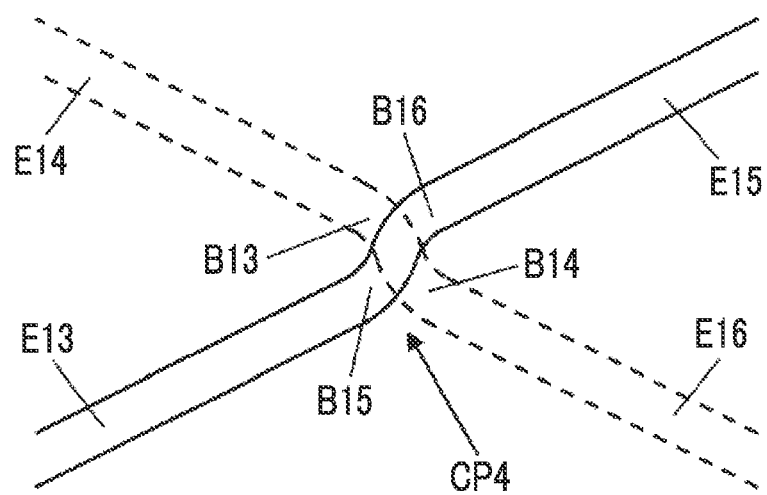
FIG. 12 is a partially enlarged plan view showing a portion where a first fine metal wire of a first electrode and a second fine metal wire of a second electrode according to a modification example of the fourth embodiment overlap each other.

In addition, the present invention is not limited to the configuration where the second fine metal wire E14 has the bending portion B13 and the fourth fine metal wire E16 has the bending portion B14. For example, as shown in FIG. 12, a configuration in which the first fine metal wire E13 has a bending portion B15 having a curved shape, the second fine metal wire E14 has the bending portion B13 having a curved shape, the third fine metal wire E15 has a bending portion B16 having a curved shape, and the fourth fine metal wire E16 has the bending portion B14 having a curved shape can also be adopted.

Fifth Embodiment

In the first embodiment, the mesh pattern MP1 of the first electrode 11 and the second electrode 21 is obtained by randomly redisposing positions of intersection portions between a plurality of fine metal wires MW3 and a plurality of fine metal wires MW4 in a given range relative to a regular reference mesh pattern MP2 including a plurality of rhombic reference mesh cells MC2. In the present invention, the shape of the mesh pattern MP1 is not limited to this configuration.

Figure 13:
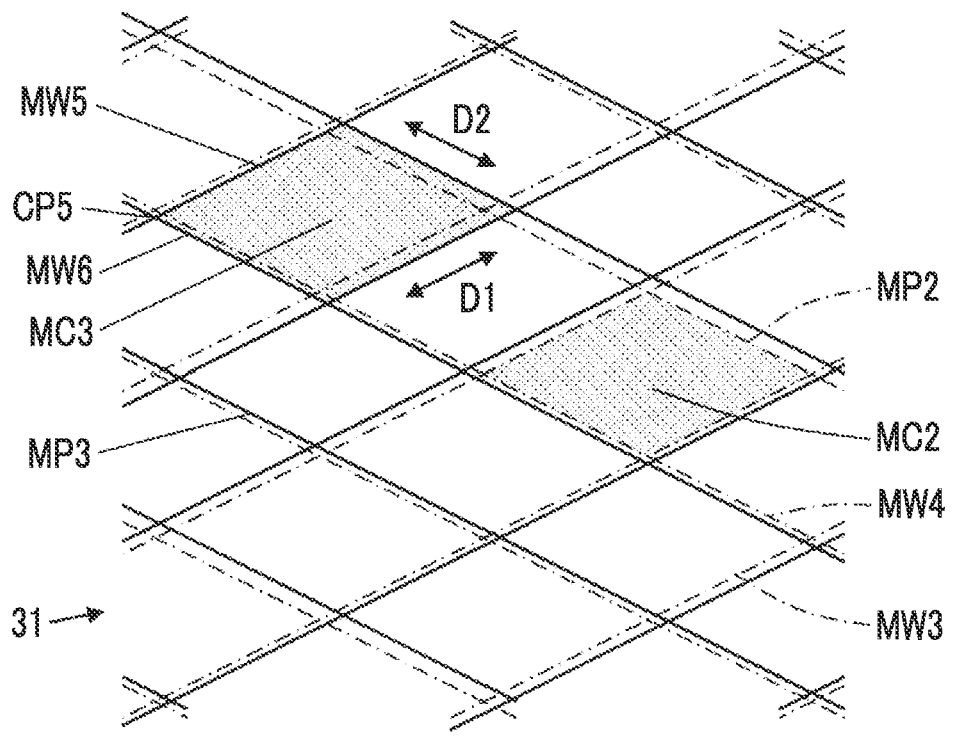
FIG. 13 is a partially enlarged plan view showing a first electrode portion according to a fifth embodiment.

FIG. 13 is a partially enlarged plan view showing a first electrode 31 according to a fifth embodiment.

The first electrode 31 includes: a plurality of fine metal wires MW5 that extend substantially in the first direction D1 in a plan view; and a plurality of fine metal wires MW6 that extend substantially in the second direction D2 in a plan view. In addition, the plurality of fine metal wires MW5 and the plurality of fine metal wires MW6 intersect each other to be electrically connected on the same surface such that a plurality of intersection portions CP5 where the fine metal wires MW5 and the fine metal wires MW6 intersect each other are formed.

In addition, the plurality of fine metal wires MW5 and the plurality of fine metal wires MW6 intersect each other this way such that a plurality of parallelogram irregular mesh cells MC3 are formed, and a mesh pattern MP3 is formed of the plurality of irregular mesh cells MC3. As indicated by a dotted line in FIG. 13, the mesh pattern MP3 is obtained by randomly changing each of a distance between the fine metal wires MW4 adjacent to each other in the first direction D1 and a distance between the fine metal wires MW3 adjacent to each other in the second direction D2 in a given range relative to a regular reference mesh pattern MP2 including a plurality of rhombic reference mesh cells MC2, the plurality of fine metal wires MW3 extending linearly in the first direction D1, the plurality of fine metal wires MW4 extending linearly in the second direction D2, and the plurality of rhombic reference mesh cells MC2 being formed by the fine metal wires MW3 and the fine metal wires MW4.

Here, as the method of randomly changing each of the distance (pitch) between the fine metal wires MW4 adjacent to each other in the first direction D1 and the distance (pitch) between the fine metal wires MW3 adjacent to each other in the second direction D2 in the given range, a method of translating the fine metal wires MW3 of the reference mesh pattern MP2 in the second direction D2 in the given range and translating the fine metal wires MW4 in the first direction D1 in the given range, that is, a method of randomly changing an interval between at least one pair of parallel sides of the regular rhombic reference mesh cell MC2 in the given range can be used.

From the viewpoint of suppressing moire, it is preferable that the range where the interval between at least one pair of parallel sides of the regular rhombic reference mesh cell MC2 is changed is a length range that is more than or equal to $1/50$ the distance between adjacent two parallel sides of the rhombic reference mesh cell MC2 in each of the first direction D1 and the second direction D2. However, in a case where an irregularity of the irregular mesh cell MC3 with respect to the regular rhombic reference mesh cell MC2 is excessively large, density unevenness recognized in a case where the touch panel is disposed on the display module 8 increases. Therefore, the range where the interval between at least one pair of parallel sides of the regular rhombic reference mesh cell MC2 is changed is a length range that is preferably less than or equal to $1/10$ and more preferably less than or equal to $1/20$ the distance between adjacent two parallel sides of the rhombic reference mesh cell MC2 in each of the first direction D1 and the second direction D2.

In a case where each of the pitch of the reference mesh pattern MP1 in the first direction D1 and the pitch of the reference mesh pattern MP1 in the second direction D2 is randomly changed in the given range, the irregularity [%] of the irregular mesh cell MC3 with respect to the regular rhombic reference mesh cell MC2 can be represented by Expression (2).

$$\text{(Irregularity)} = \text{(Distance by which One Side of Rhombic Reference Mesh Cell MC2 is Translated)}/\text{(Distance between Two Parallel Sides of Rhombic Reference Mesh Cell MC2)} \times 100 \quad (2)$$

Accordingly, the irregularity is preferably 2% or more and 10% or less and more preferably 2% or more and 5% or less.

This way, the irregular mesh cell MC3 has a shape obtained by modifying a rhombus.

Here, all of the irregular mesh cells MC3 obtained by connecting the plurality of intersection portions CP5 using a straight line can be called modified rhombuses as long as the length of each of the sides is within 20% with respect to the average value of four sides. In addition, the regular reference mesh cell MC2 can be restored by obtaining the average value of the lengths of the sides of 100 irregular mesh cells MC3 adjacent to each other with respect to any intersection portion CP5.

From the viewpoint of suppressing moire, an acute angle of the rhombic mesh cells MC3 of the regular reference mesh pattern MP3 is more preferably 55 degrees to 80 degrees and most preferably 65 degrees to 75 degrees.

In addition, as in the first electrode 31, the second electrode according to the fifth embodiment has the mesh pattern MP3 that is formed by the plurality of irregular mesh cells MC3 as shown in FIG. 13.

Even in a case where the mesh pattern MP3 has the shape shown in FIG. 13, as in the case where the mesh pattern MP1 according to the first embodiment has the shape shown in FIG. 3, in a case where the touch panel including the conductive member for a touch panel according to the fifth embodiment is used for the image display apparatus, the occurrence of moire is suppressed, and the graininess is also reduced.

In the above description, the aspect of the fifth embodiment is applied to the first embodiment. The same can be applied to the second embodiment to the fourth embodiment.

Sixth Embodiment

In the first embodiment, the first conductive layer 6A is disposed on the first surface 5A side of the transparent insulating substrate 5, and the second conductive layer 6B is disposed on the second surface 5B side of the transparent insulating substrate 5. The disposition of the first conductive layer 6A and the second conductive layer 6B is not limited to this configuration.

Figure 14:
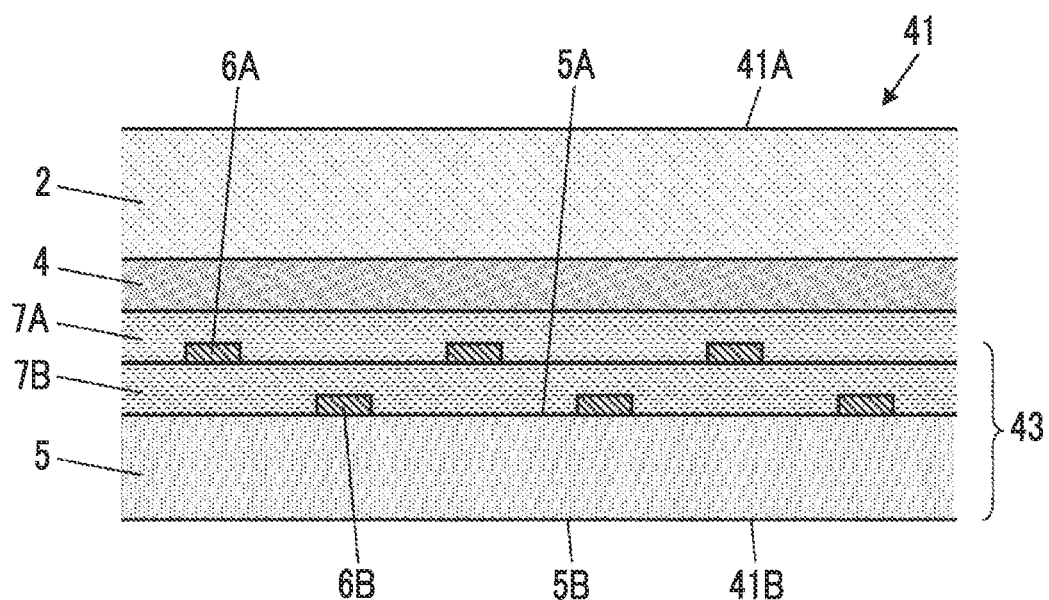
FIG. 14 is a partial cross-sectional view showing a touch panel according to a sixth embodiment.

FIG. 14 illustrates a configuration of a touch panel 41 according to a sixth embodiment.

The touch panel 41 includes a front surface 41A and a back surface 41B, and is used in a state where the display module 8 is disposed on the back surface 41B side. The front surface 41A of the touch panel 41 is a touch detection surface and is a visible side where an operator of the touch panel 41 observes an image displayed on the display module 8 through the touch panel 41.

The touch panel 41 includes the cover panel 2 that is disposed on the front surface 41A, and a conductive member for a touch panel 43 is bonded to a surface of the cover panel 2 opposite to the front surface 41A using the transparent adhesive 4.

The conductive member for a touch panel 43 includes: the transparent insulating substrate 5; the second conductive layer 6B that is formed on the first surface 5A of the transparent insulating substrate 5; the transparent insulating member 7B that is formed on the second conductive layer 6B; and the first conductive layer 6A that is formed on the transparent insulating member 7B. In addition, as shown in FIG. 14, in order to protect or planarize the first conductive layer 6A, the transparent insulating member 7A may be disposed to cover the first conductive layer 6A. The first conductive layer 6A, the second conductive layer 6B, and the transparent insulating members 7A and 7B may be formed on the second surface 5B of the transparent insulating substrate 5.

This way, even in a case where the first conductive layer 6A and the second conductive layer 6B are disposed on the first surface 5A side of the transparent insulating substrate 5, as in the conductive member for a touch panel 3 according to the first embodiment where the first conductive layer 6A is disposed on the first surface 5A side of the transparent insulating substrate 5 and the second conductive layer 6B is disposed on the second surface 5B side of the transparent insulating substrate 5, in a case where the touch panel 41 including the conductive member for a touch panel 43 according to the sixth embodiment is used for the image display apparatus, the occurrence of moire is suppressed, and the graininess is also reduced.

In the above description, the aspect of the sixth embodiment is applied to the first embodiment. The same can be applied to the second embodiment to the fifth embodiment.

Hereinafter, each of the members forming the conductive member for a touch panel 3 according to the first embodiment will be described. Each of the members forming the conductive members for a touch panel according to the second embodiment to the fifth embodiment and the conductive member for a touch panel 43 according to the sixth embodiment is based on each of the members forming the conductive member for a touch panel 3 according to the first embodiment.

<Transparent Insulating Substrate>

The transparent insulating substrate 5 is not particularly limited as long as it is transparent, has electric insulating characteristics, and supports the first conductive layer 6A and the second conductive layer 6B. For example, a resin substrate or a glass substrate is used. More specifically, as a material for forming the transparent insulating substrate 5, for example, glass, reinforced glass, non-alkali glass, polyethylene terephthalate (PET), polyethylene naphthalate (PEN), a cycloolefin polymer (COP), a cyclic olefin copolymer (COC), polycarbonate (PC), an acrylic resin, polyethylene (PE), polypropylene (PP), polystyrene (PS), polyvinyl chloride (PVC), polyvinylidene chloride (PVDC), or cellulose triacetate (TAC) can be used. The thickness of a transparent insulating substrate 5 is, for example, preferably 20 μm to 1100 μm and more preferably 20 μm to 500 μm. In particular, in a case where an organic resin substrate such as PET is used, the thickness is preferably 20 μm to 200 μm and more preferably 30 μm to 100 μm.

The total light transmittance of the transparent insulating substrate 5 is preferably 40% to 100%. The total light transmittance is measured using "Plastics—Determination of Total Luminous Transmittance And Reflectance" defined by JIS K 7375:2008.

Examples of a preferable aspect of the transparent insulating substrate 5 include a treated substrate that undergoes at least one treatment selected from the group consisting of an atmospheric pressure plasma treatment, a corona discharge treatment, and an ultraviolet irradiation treatment. By performing the above-described treatment, a hydrophilic group such as an OH group is introduced into the treated surface of the transparent insulating substrate 5 such that such that the adhesiveness between the transparent insulating substrate 5 and the first conductive layer 6A and the adhesiveness between the transparent insulating substrate 5 and the second conductive layer 6B are improved. In addition, the atmospheric pressure plasma treatment is preferable among the above-described treatments from the viewpoint of further improving the adhesiveness between the transparent insulating substrate 5 and the first conductive layer 6A and the adhesiveness between the transparent insulating substrate 5 and the second conductive layer 6B.

<Undercoat Layer>

In order to improve the adhesiveness between the transparent insulating substrate 5 and the first conductive layer 6A and the adhesiveness between the transparent insulating substrate 5 and the second conductive layer 6B, an undercoat layer can also be disposed between the transparent insulating substrate 5 and the first conductive layer 6A and between the transparent insulating substrate 5 and the second conductive layer 6B. This undercoat layer includes a polymer such that the adhesiveness between the transparent insulating substrate 5 and the first conductive layer 6A and the adhesiveness between the transparent insulating substrate 5 and the second conductive layer 6B can be further improved.

A method of forming the undercoat layer is not particularly limited, and examples thereof include a method of applying a composition for forming an undercoat layer including a polymer to the substrate and optionally performing a heat treatment thereon. In addition, as a composition for forming an undercoat layer including a polymer, for example, gelatin, an acrylic resin, a urethane resin, or an acrylic styrene latex including fine particles of an inorganic material or a polymer may be used.

Optionally, in the conductive member for a touch panel 3, as a layer other than the above-described undercoat layer, a refractive index adjusting layer may be provided between the transparent insulating substrate 5 and the first conductive layer 6A and between the transparent insulating substrate 5 and the second conductive layer 6B. As the refractive index adjusting layer, for example, an organic layer to which particles of a metal oxide such as zirconium oxide for adjusting a refractive index can be used.

<Fine Metal Wire>

The thicknesses of the fine metal wires MW1 and MW2 of the first electrode 11 and the second electrode 21 according to the first embodiment to the fourth embodiment and the sixth embodiment and the fine metal wires MW5 and MW6 of the first electrode 31 and the second electrode according to the fifth embodiment are not particularly limited and are preferably 0.01 µm to 10.00 µm, more preferably 2.00 µm or less, still more preferably 0.02 µm to 1.00 µm, and most preferably 0.02 µm to 0.60 µm. As a result, the improvement of the durability of the first electrodes 11 and 31 and the second electrode 21 can be easily realized.

A material for forming the fine metal wires MW1, MW2, MW5, and MW6 is a metal or an alloy. For example, the fine metal wires MW1, MW2, MW5, and MW6 can be formed of copper, aluminum, or silver. It is preferable that the fine metal wires MW1, MW2, MW5, and MW6 include copper. However, the fine metal wires MW1, MW2, MW5, and MW6 may include a metal other than copper, for example, gold or silver. In addition, the fine metal wires MW1, MW2, MW5, and MW6 may include metallic silver, gelatin, or a polymer binder such as an acrylic styrene latex that is suitable for forming a mesh pattern. Other preferable examples of the material include a metal and an alloy of aluminum, silver, molybdenum, and titanium. In addition, a laminated structure of the materials may be used. For example, a fine metal wire having a laminated such structure as molybdenum/copper/molybdenum or molybdenum/aluminum/molybdenum can be used.

Further, for example, the fine metal wires MW1, MW2, MW5, and MW6 may include metal oxide particles, a metal paste such as a silver paste or a copper paste, or metal nanowire particles such as silver nanowire or copper nanowire.

In order to improve the visibility of the fine metal wires MW1, MW2, MW5, and MW6, a blackening layer may be formed on at least visible side of the fine metal wires MW1, MW2, MW5, and MW6. As the blackening layer, a metal oxide, a metal nitride, a metal oxynitride, or a metal sulfide can be used. Representatively, for example, copper oxynitride, copper nitride, copper oxide, or molybdenum oxide can be used.

Next, a method of forming the fine metal wires MW1, MW2, MW5, and MW6 will be described. As the method of forming the fine metal wires, for example, a sputtering method, a plating method, a silver halide method, or a printing method can be appropriately used.

A method of forming the fine metal wires MW1, MW2, MW5, and MW6 using a sputtering method will be described. First, by forming a copper foil layer by sputtering and forming a copper wire using the copper foil layer by photolithography, the fine metal wires MW1, MW2, MW5, and MW6 can be formed. The copper foil layer can also be formed by so-called vapor deposition instead of sputtering. As the copper foil layer, an electrolytic copper foil can be used in addition to a sputtered copper foil a vapor deposition copper foil. More specifically, a step of forming copper wires described in JP2014-29614A can be used.

A method of forming the fine metal wires MW1, MW2, MW5, and MW6 using a plating method will be described. For example, the fine metal wires MW1, MW2, MW5, and MW6 can be formed using a metal plating film that is formed on an electroless plating underlayer by performing electroless plating on the underlayer. In this case, the fine metal wires MW1, MW2, MW5, and MW6 are formed by forming a catalyst ink including at least metal fine particles on a substrate in a patterned manner and dipping the substrate in an electroless plating bath to form a metal plating film. More specifically, a method of manufacturing a metal-coated substrate described in JP2014-159620A can be used.

In addition, the fine metal wires MW1, MW2, MW5, and MW6 are formed by forming a resin composition having at least a functional group capable of interacting a metal catalyst precursor on a substrate in a patterned manner, adding a catalyst or catalyst precursor, and dipping the substrate in an electroless plating bath to form a metal plating film. More specifically, a method of manufacturing a metal-coated substrate described in JP2012-144761A can be used.

A method of forming the fine metal wires MW1, MW2, MW5, and MW6 using a silver halide method will be described. First, by exposing a silver halide emulsion layer including silver halide using an exposure pattern for forming the fine metal wires MW1, MW2, MW5, and MW6 and developing the exposed silver halide layer, the fine metal wires MW1, MW2, MW5, and MW6 can be formed. More specifically, a method of manufacturing the fine metal wire described in JP2012-6377A, JP2014-112512A, JP2014-209332A, JP2015-22397A, JP2016-192200A, or WO2016/157585A can be used.

A method of forming the fine metal wires MW1, MW2, MW5, and MW6 using a printing method will be described. First, by applying a conductive paste including conductive powder to a substrate in the same pattern as the fine metal wires MW1, MW2, MW5, and MW6 and subsequently heating the conductive paste, the fine metal wires MW1, MW2, MW5, and MW6 can be formed. The pattern formation using the conductive paste is performed, for example, using an ink jet method or a screen printing method. As the conductive paste, more specifically, a conductive paste described in JP2011-28985A can be used.

<Cover Panel>

As a material of the cover panel 2, for example, reinforced glass, polycarbonate, polyethylene terephthalate, or polymethyl methacrylate (PMMA) can be used. The thickness of the cover panel 2 is preferably 0.1 mm to 1.5 mm.

<Adhesive>

As the adhesive 4 that bonds the cover panel 2 and the conductive member for a touch panel 3 to each other, an optical transparent adhesive sheet (optical clear adhesive: OCA) or an optical transparent adhesive resin (optical clear resin: OCR) can be used, and the film thickness thereof is preferably 10 µm or more and 200 µm or less. As the optical transparent adhesive sheet, for example, 8146 series (manufactured by 3M) can be used.

EXAMPLES

The present invention will be described in more detail based on the following examples. Materials, used amounts, ratios, treatment details, and treatment procedures shown in the following examples can be appropriately changed within a range not departing from the scope of the present invention. Accordingly, the scope of the present invention is not limited to the following examples.

Example 1

First, as the transparent insulating substrate, a PET film (manufactured by Toyobo Co., Ltd., COSMOSHINE A4300) having a thickness of 50 µm where an easy adhesion layer was formed on both surfaces was prepared.

<Formation of Copper Film>

Next, as the adhesion layer, a copper oxide film was formed on both surfaces of the PET film. In this case, copper was used as a target, and while introducing mixed gas of oxygen gas (flow rate: 90 sccm) and argon gas (flow rate: 270 sccm) into a sputtering device, sputtering was performed under conditions of film formation chamber internal pressure: 0.4 Pa, power density: 1.7 W/cm$^2$, and film formation roll temperature: 90° C. The film thickness of the obtained copper oxide film was 20 nm.

Next, a copper film was formed on the copper oxide film on the first surface side among the copper oxide film formed on both of the surfaces of the PET film. Copper was used as a target, and while introducing argon gas (flow rate: 270 sccm) into a sputtering device, sputtering was performed under conditions of film formation chamber internal pressure: 0.4 Pa, power density: 4.2 W/cm$^2$, and film formation roll temperature: 90° C. In the laminate obtained as described above, the film thickness of the copper film was 300 nm.

<Patterning of Metal Wire>

After forming the copper film, a rust preventing treatment was performed on the copper film, and the copper film was patterned by photolithography. In this case, a positive tone resist was applied to the copper film to form a film having a film thickness of 2 µm. Next, a glass photomask having a mesh pattern with a line width of 5 µm corresponding to the mesh pattern MP1 of FIG. 1 was prepared, the copper film was irradiated with light from a metal halide lamp in a state where the glass photomask was disposed on the resist film, and the laminate where the resist film was disposed was dipped in a sodium hydroxide aqueous solution having a concentration of 3% to be developed. As a result, the resist film having the pattern corresponding to the mesh pattern MP1 of FIG. 1 was obtained. By using the resist film as a mask, the copper oxide film and the copper film were simultaneously etched using a ferric chloride aqueous solution having a concentration 5% to pattern metal wires. Finally, the remaining resist film was peeled off, a conductive member for a touch panel including the first conductive layer 6A having the mesh pattern MP1 of FIG. 1 was obtained.

The mesh pattern MP1 according to Example 1 was obtained by modifying the reference mesh pattern MP2 in which the rhombic reference mesh cells MC2 having one side length of 300 µm and an acute angle of 65 degrees were regularly arranged as indicated by a dotted line in FIG. 3.

Specifically, the mesh pattern MP1 was obtained by randomly redisposing the positions of the intersection portions between the fine metal wires MW3 and MW4 in the reference mesh pattern MP2 in a range of a circular shape having a radius of 10 µm relative to the intersection portions. The irregularity of the mesh pattern MP1 was 3.3%.

In addition, as shown in FIG. 6, the first fine metal wire E1 to the fourth fine metal wire E4 extended with respect to the intersection portion CP1 in the mesh pattern MP1, the first fine metal wire E1 had the bending portion B3, the second fine metal wire E2 had the bending portion B1, the third fine metal wire E3 had the bending portion B4, and the fourth fine metal wire E4 had the bending portion B2. In addition, the bending portions B1 to B4 had a linear shape.

The starting points of bending of the bending portions B1 to B4 were designed as points obtained by randomly redisposing the positions of the intersection portions between the fine metal wires MW3 and MW4 in the reference mesh pattern MP2 and subsequently, on the two pairs of fine metal wires MW3 and MW4 between which the acute angle was interposed, translating points positioned at a distance of 15 µm from the intersection portions CP1 toward an outer side of the acute angle by 2.5 µm in directions perpendicular to the corresponding fine metal wires MW3 and MW4. The starting points of bending of the bending portions B1 to B4 designed as described above were disposed at positions of 15.2 µm from the intersection portion CP1. In a case where the average value of the lengths of the sides of the mesh cells MC1 in the mesh pattern MP1 was 300 µm, the starting points of bending of the bending portions B1 to B4 were disposed at positions of substantially ¹/₂₀ the length of one side of the mesh cell MC1 from the intersection portion CP1.

As a result, all of the intersection portions CP1 in the mesh pattern MP1 had the bending portions B1 to B4.

In addition, in Example 1, the average line width of the fine metal wires MW1 and MW2 forming the mesh pattern MP1 was 4.7 µm.

In addition, the average intersecting angle between the first fine metal wire E1 and the second fine metal wire E2 was about 85 degrees and was more than the acute angle interposed between the first fine metal wire E1 and the second fine metal wire E2. In addition, the average intersecting angle between the third fine metal wire E3 and the fourth fine metal wire E4 was about 85 degrees and was more than the acute angle interposed between the third fine metal wire E3 and the fourth fine metal wire E4.

Here, the line width of the mesh pattern MP1 was measured based on optical microscopic images obtained using an optical microscope at magnifications of 1000-fold and 100-fold.

In addition, the average intersecting angle of the first fine metal wire E1 and the second fine metal wire E2 and the average intersecting angle of the third fine metal wire E3 and the fourth fine metal wire E4 were calculated by imaging 20 intersection portions CP1 in the mesh pattern MP1 using an optical microscope at magnifications of 1000-fold and 100- fold, imaging the intersecting angle of each of the intersection portions CP1 based on the obtained optical microscopic images, and averaging the intersecting angles.

Example 2

A conductive member for a touch panel according to Example 2 was prepared using the same method as that of Example 1, except that, as shown in FIG. 8, the bending portions B5 to B8 had a curved shape consisting of a two-dimensional curve and the mesh pattern MP1 was obtained by modifying a reference mesh pattern MP2 of a rhombus having an acute angle of 60 degrees instead of the reference mesh pattern MP2 of a rhombus having an acute angle of 65 degrees.

Example 3

A conductive member for a touch panel according to Example 3 was prepared using the same method as that of Example 2, except that the line width of the mesh pattern of the glass photomask was changed to 2.5 μm. In Example 3, the line width of the fine metal wires MW1 and MW2 forming the mesh pattern MP1 was 2.4 μm.

Example 4

A conductive member for a touch panel according to Example 4 was prepared using the same method as that of Example 2, except that the line width of the mesh pattern of the glass photomask was changed to 1.5 μm. In Example 4, the line width of the fine metal wires MW1 and MW2 forming the mesh pattern MP1 was 1.4 μm.

Example 5

A conductive member for a touch panel according to Example 5 was prepared using the same method as that of Example 2, except that the starting points of bending of the bending portions B5 to B8 were designed as points obtained by randomly redisposing the positions of the intersection portions between the fine metal wires MW3 and MW4 in the reference mesh pattern MP2 and subsequently, on the two pairs of fine metal wires MW3 and MW4 between which the acute angle was interposed, translating points positioned at a distance of 50 μm from the intersection portions CP2 toward an outer side of the acute angle by 9 μm in directions perpendicular to the corresponding fine metal wires MW3 and MW4.

The starting points of bending of the bending portions B5 to B8 in Example 5 were disposed at positions at a distance of 50.8 μm from the intersection portion CP2. In a case where the average value of the lengths of the sides of the mesh cells MC1 in the mesh pattern MP1 was 300 μm, the starting points of bending of the bending portions B5 to B8 were disposed at positions of substantially ⅙ the length of one side of the mesh cell MC1 from the intersection portion CP2.

Example 6

A conductive member for a touch panel according to Example 6 was prepared using the same method as that of Example 2, except that the starting points of bending of the bending portions B5 to B8 were designed as points obtained by randomly redisposing the positions of the intersection portions between the fine metal wires MW3 and MW4 in the reference mesh pattern MP2 and subsequently, on the two pairs of fine metal wires MW3 and MW4 between which the acute angle was interposed, translating points positioned at a distance of 25 μm from the intersection portions CP2 toward an outer side of the acute angle by 4 μm in directions perpendicular to the corresponding fine metal wires MW3 and MW4.

The starting points of bending of the bending portions B5 to B8 in Example 6 were disposed at positions at a distance of 25.3 μm from the intersection portion CP2. In a case where the average value of the lengths of the sides of the mesh cells MC1 in the mesh pattern MP1 was 300 μm, the starting points of bending of the bending portions B5 to B8 were disposed at positions of substantially 1/12 the length of one side of the mesh cell MC1 from the intersection portion CP2.

Example 7

A conductive member for a touch panel according to Example 7 was prepared using the same method as that of Example 3, except that the mesh pattern MP1 was obtained by modifying a reference mesh pattern MP2 of a rhombus having an acute angle of 55 degrees instead of the reference mesh pattern MP2 of a rhombus having an acute angle of 60 degrees.

In the conductive member for a touch panel according to Example 7, the average intersecting angle of the first fine metal wire E5 and the second fine metal wire E6 and the average intersecting angle of the third fine metal wire E7 and the fourth fine metal wire E8 were about 80 degrees and were more than the acute angle interposed between the first fine metal wire E5 and the second fine metal wire E6 and the acute angle interposed between the third fine metal wire E7 and the fourth fine metal wire E8.

Example 8

A conductive member for a touch panel according to Example 8 was prepared using the same method as that of Example 3, except that the mesh pattern MP1 was obtained by modifying a reference mesh pattern MP2 of a rhombus having an acute angle of 75 degrees instead of the reference mesh pattern MP2 of a rhombus having an acute angle of 60 degrees.

In the conductive member for a touch panel according to Example 8, the average intersecting angle of the first fine metal wire E5 and the second fine metal wire E6 and the average intersecting angle of the third fine metal wire E7 and the fourth fine metal wire E8 were about 100 degrees and were more than the acute angle interposed between the first fine metal wire E5 and the second fine metal wire E6 and the acute angle interposed between the third fine metal wire E7 and the fourth fine metal wire E8. Accordingly, the angle interposed between the first fine metal wire E5 and the fourth fine metal wire E8 and the angle interposed between the second fine metal wire E6 and the third fine metal wire E7 were acute angles.

Example 9

Further, A conductive member for a touch panel according to Example 9 was prepared using the same method as that of Example 1, except that the mesh pattern MP1 was patterned such that the second fine metal wire E2 had the bending portion B1, the fourth fine metal wire E4 had the bending portion B2, and the first fine metal wire E1 and the third fine metal wire E3 did not have the bending portion as shown in FIG. 4 instead of the configuration in which the first fine metal wire E1 had the bending portion B3, the second fine metal wire E2 had the bending portion B1, the third fine metal wire E3 had the bending portion B4, and the fourth fine metal wire E4 had the bending portion B2 as shown in FIG. 6.

In the conductive member for a touch panel according to Example 9, the average intersecting angle of the first fine metal wire E1 and the second fine metal wire E2 and the average intersecting angle of the third fine metal wire E3 and the fourth fine metal wire E4 were about 75 degrees and were more than the acute angle interposed between the first fine metal wire E1 and the second fine metal wire E2 and the acute angle interposed between the third fine metal wire E3 and the fourth fine metal wire E4.

Example 10

Using the same method as the method of forming the copper film in Example 1, a copper film having a thickness of 300 nm was formed on the copper oxide film on the first surface side among the copper oxide film formed on both of the surfaces of the PET film. Next, a glass photomask having a mesh pattern where the mesh cells MC1 having a length that was double the length of one side of the mesh cell MC1 in the Example 1 were continuous was prepared. By using the glass photomask, the formed copper film was patterned using the same method as the method of patterning the metal wire in Example 1.

Using the same method as the method of forming the copper film in Example 1, a copper film having a thickness of 300 nm was formed on the copper oxide film on the second surface side of the PET film. Next, a glass photomask having a mesh pattern forming the mesh pattern MP1 in Example 1 in a plan view was prepared by forming a pattern where the mesh cells MC1 having a length that was double the length of one side of the mesh cell MC1 in the Example 1 were continuous and causing this pattern to overlap the mesh pattern of the glass photomask used on the first surface side of the PET film. By using the glass photomask, the formed copper film was patterned using the same method as the method of patterning the metal wire in Example 1.

As a result, a conductive member for a touch panel according to Example 10 including the first conductive layer 6A and the second conductive layer 6B was obtained. In the conductive member for a touch panel according to Example 10, the first conductive layer 6A and the second conductive layer 6B overlapped each other to form the mesh pattern MP1 of FIG. 1 in a plan view.

In addition, as shown in FIG. 10, the fine metal wire MW1 in the first conductive layer 6A and the fine metal wire MW2 in the second conductive layer 6B were disposed to be electrically insulated from each other and intersect each other. As a result, the intersection portion CP3 was formed. With respect to the intersection portion CP3, the first fine metal wire E9, the second fine metal wire E10, the third fine metal wire E11, and the fourth fine metal wire E12 extended. In addition, the first fine metal wire E9 had the bending portion B11, the second fine metal wire E10 had the bending portion B9, the third fine metal wire E11 had a bending portion B12, and the fourth fine metal wire E12 had the bending portion B10.

The conductive member for a touch panel according to Example 10 was the same as the conductive member for a touch panel according to Example 1, except that the first conductive layer 6A was provided on the first surface side of the PET film, the second conductive layer 6B was provided on the second surface side of the PET film, and the first conductive layer 6A and the second conductive layer 6B overlapped each other to form the mesh pattern MP1 in a plan view.

Example 11

A conductive member for a touch panel was prepared, in which the mesh pattern of the glass photomask was the mesh pattern corresponding to the mesh pattern MP3 shown in FIG. 13 and the line width thereof was 4 μm. As indicated by a dotted line in FIG. 13, the mesh pattern MP3 in Example 11 was obtained by randomly changing each of the distance between the fine metal wires MW4 adjacent to each other in the first direction D1 and the distance between the fine metal wires MW3 adjacent to each other in the second direction D2 in a range of +10 μm relative to the regular reference mesh pattern MP2 in which the rhombic reference mesh cells MC2 having one side length of 300 μm and an acute angle of 65 degrees were regularly arranged. The irregularity of the mesh pattern MP3 was 3.3%.

In addition, the bending portions B1 to B4 were formed on the intersection portion CP5 that was randomly redisposed as in Example 1.

In addition, the average line width of the fine metal wires MW5 and MW6 forming the mesh pattern MP3 in Example 11 was 3.8 μm.

As a result, all of the intersection portions CP5 in the mesh pattern MP3 had the bending portions B1 to B4.

Example 12

A conductive member for a touch panel according to Example 12 was prepared using the same method as that of Example 11, except that, among the four fine metal wires having a length of 15 μm extending with respect to the intersection portion CP5 in the mesh pattern MP3, the intersecting angle of a pair of fine metal wires between which the acute angle was interposed was 90 degrees and was disposed to be shifted to the outer side of the acute angle by 12.5 degrees with respect to the fine metal wires MW5 and MW6 of the mesh pattern MP3.

Comparative Example 1

A conductive member for a touch panel according to Comparative Example 1 was prepared using the same method as that of Example 1, except that the mesh pattern of the glass photomask was changed to a regular pattern in which rhombuses having one side length of 300 μm and an acute angle of 65 degrees were continuous.

Comparative Example 2

A conductive member for a touch panel according to Comparative Example 2 was prepared using the same method as that of Example 1, except that the mesh pattern of the glass photomask was changed to a mesh pattern in which the first fine metal wire E1 to the fourth fine metal wire E4 extending with respect to the intersection portion CP1 did not have the bending portions B1 to B4 as shown in FIG. 6.

Comparative Example 3

A conductive member for a touch panel according to Comparative Example 3 was prepared using the same method as that of Example 10, except that each of the mesh patterns of the two glass photomasks used for both of the surfaces of the PET film was changed to a mesh pattern in which the first fine metal wire E9 to the fourth fine metal wire E12 extending with respect to the intersection portion CP3 did not have the bending portions B9 to B12 as shown in FIG. 10.

For the conductive members for a touch panel according to Examples 1 to 12 and Comparative Examples 1 to 3 prepared as described above, the evaluation of graininess and the evaluation of moire described below were performed.

<Evaluation of Graininess>

Each of the conductive members for a touch panel according to Examples 1 to 12 and Comparative Examples 1 to 3 was disposed on Schaukasten of a white fluorescent lamp, and was observed in a plan view by visual inspection of five evaluators from positions at a distance of 30 cm from the conductive member for a touch panel. As a result, the graininess felt by the evaluators was evaluated based on the following evaluation standards, and the most evaluation results was set as the final evaluation result.

A: the conductive member for a touch panel looked uniform without graininess.
B: the graininess was small.
C: the graininess was slightly strong.
D: the graininess was strong.

"D" is a level where there is a problem in practice, "C" is a level where there is no problem in practice, "B" is a good level, and "A" is an excellent level.

<Evaluation of Moire>

Each of the conductive members for a touch panel according to Examples 1 to 12 and Comparative Examples 1 to 3 was disposed on a high-definition liquid crystal panel of a 7.9 inch quad extended graphics array (QXGA), and was observed in a plan view by visual inspection of five evaluators from positions at a distance of 30 cm from the conductive member for a touch panel. As a result, moire generated by interference between the mesh patterns MP1 and MP3 of the conductive member for a touch panel and the pixel pattern of the high-definition liquid crystal panel was evaluated based on the following evaluation standards, and the most evaluation results was set as the final evaluation result.

A: the moire was not observed.
B: the moire was observed.

Regarding Examples 1 to 12 and Comparative Examples 1 to 3, the evaluation results of graininess and the evaluation results of moire are shown in Table 1.

TABLE 1

| | Conductive layer | Mesh form | Acute angle (degree) of reference mesh pattern | Line width (μm) | Fine metal wires having bending portions | Ratio of intersections having bending portions (%) | Distance from intersection portion to starting point of bending (μm) | Average transition amount of starting point of bending (μm) | Intersecting angle (degree) | Shape of bending portion | Graininess | Moire |
|---|---|---|---|---|---|---|---|---|---|---|---|---|
| Example 1 | Single surface | Irregular | 65 | 4.7 | First to fourth | 100 | 15.2 | 2.5 | 85 | Linear | B | A |
| Example 2 | Single surface | Irregular | 60 | 4.7 | First to fourth | 100 | 15.2 | 2.3 | 85 | Curved | B | A |
| Example 3 | Single surface | Irregular | 60 | 2.4 | First to fourth | 100 | 15.2 | 2.5 | 85 | Curved | A | A |
| Example 4 | Single surface | Irregular | 60 | 1.4 | First to fourth | 100 | 15.2 | 2.5 | 85 | Curved | A | A |
| Example 5 | Single surface | Irregular | 60 | 4.7 | First to fourth | 100 | 50.8 | 9.0 | 85 | Curved | C | A |
| Example 5 | Single surface | Irregular | 60 | 4.7 | First to fourth | 100 | 25.3 | 4.0 | 85 | Curved | B | A |
| Example 7 | Single surface | Irregular | 55 | 2.4 | First to fourth | 100 | 15.2 | 2.5 | 80 | Curved | B | A |
| Example 8 | Single surface | Irregular | 75 | 2.4 | First to fourth | 100 | 15.2 | 2.5 | 100 | Curved | B | A |
| Example 9 | Single surface | Irregular | 65 | 4.7 | Second and fourth | 100 | 15.2 | 2.5 | 75 | Linear | C | A |
| Example 10 | Both | Irregular | 65 | 4.7 | First to fourth | 100 | 15.2 | 2.5 | 85 | Linear | B | A |
| Example 11 | Single surface | Irregular | 65 | 3.8 | First to fourth | 100 | 15.2 | 2.3 | 85 | Linear | B | A |
| Example 12 | Single surface | Irregular | 65 | 3.8 | First to fourth | 100 | 15.0 | 3.2 | 90 | Linear | A | A |
| Comparative Example 1 | Single surface | Regular | 65 | 4.7 | None | — | — | — | — | — | C | B |
| Comparative Example 2 | Single surface | Irregular | 65 | 4.7 | None | — | — | — | 65 | — | D | A |
| Comparative Example 3 | Both surfaces | Irregular | 65 | 4.7 | None | — | — | — | 65 | — | D | A |

In Examples 1 to 12, the evaluation results of graininess were "A", "B", or "C", and the evaluation results of moire were all "A". In particular, in Examples 3, 4, and 12, the evaluation results of graininess and the evaluation results of moire were all "A" and were excellent.

Regarding the fine metal wires MW1 and MW2 forming the mesh pattern MP1, the line width of Example 3 was 2.4 μm, and the line width of Example 4 was 1.4 μm. Therefore, it is considered that the fine metal wires MW1 and MW2 were inconspicuous and the evaluators did not feel graininess.

In addition, in Example 12, the intersecting angle between the pair of fine metal wires MW1 and MW2 between which the acute angle was interposed was 90 degrees. Therefore, it is considered that the acute angle interposed between the pair of fine metal wires MW1 and MW2 were inconspicuous and the evaluators did not feel graininess.

In Comparative Example 1, the evaluation result of graininess were "C", and the evaluation result of moire were "B". The conductive member for a touch panel according to Comparative Example 1 had the regular mesh pattern. Therefore, it is considered that the mesh pattern and the pixel pattern of the high-definition liquid crystal panel were likely to interfere each other, and moire was likely to be observed.

In Comparative Examples 2 to 3, the evaluation results of moire were all "A", but the evaluation results of graininess were all "D". The conductive members for a touch panel according to Comparative Examples 2 and 3 had the irregular mesh pattern. Therefore, it is considered that the interference between the mesh pattern and the pixel pattern of the high-definition liquid crystal panel was able to be suppressed. However, the fine metal wires forming the mesh pattern did not have the bending portions. Therefore, it is considered that the acute angle interposed between one pair of fine metal wires was inconspicuous and the estimator felt graininess.

It can be seen from the above results that, in the conductive member for a touch panel according to the embodiment of the present invention, the graininess can be reduced while suppressing the occurrence of moire for use in an image display apparatus.

EXPLANATION OF REFERENCES 1, 41: touch panel
1A, 41A: front surface
1B, 41B: back surface
2: cover panel
3, 43: conductive member for a touch panel
4, 4A: adhesive
5: transparent insulating substrate
5A, 5B: surface
6A: first conductive layer
6B: second conductive layer
7A, 7B: transparent insulating member
8: display module
9: image display apparatus
11, 31: first electrode
12: first pad
13: first peripheral wire
14: first external connection terminal
21: second electrode
22: second pad
23: second peripheral wire
24: second external connection terminal
A1 to A8: acute angle
B1 to B16: bending portion
CP1 to CP5: intersection portion
D1: first direction
D2: second direction
E1, E5, E9, E13: first fine metal wire
E2, E6, E10, E14: second fine metal wire
E3, E7, E11, E15: third fine metal wire
E4, E8, E12, E16: fourth fine metal wire
MC1 to MC3: mesh cell
MP1, MP3: mesh pattern
MP2: reference mesh pattern
MW1 to MW6: fine metal wire
S1: transmission region
S2: peripheral region
SP1 to SP8: starting point
T1 to T8: intersecting angle

What is claimed is:

1. A conductive member for a touch panel, the conductive member comprising:
    a transparent insulating substrate; and
    a conductive layer that is disposed on at least one surface of the transparent insulating substrate,
    wherein the conductive layer has a mesh pattern that includes a plurality of irregular mesh cells consisting of a modified rhombus in a plan view and is formed of a plurality of fine metal wires,
    the plurality of fine metal wires include at least one pair of fine metal wires that extend such that an acute angle of the modified rhombus is interposed between the fine metal wires,
    each of the pair of fine metal wire includes a longest straight line portion forming the acute angle of the modified rhombus,
    at least one fine metal wire among the pair of fine metal wires has a bending portion that is bent to an inner side of the acute angle from a starting point of bending on the longest straight line portion toward an intersection portion where the pair of fine metal wires intersect each other,
    the modified rhombus has a shape where at least one vertex of a regular rhombic reference mesh cell is randomly redisposed or a shape where an interval between at least one pair of parallel sides of a regular rhombic reference mesh cell is randomly changed, and has an irregularity of 2% or more and 10% or less with respect to the reference mesh cell, and
    at least one vertex of the modified rhombus is disposed on a different position from any corresponding one of vertices of the regular rhombic reference mesh cell.

2. The conductive member for a touch panel according to claim 1,
    wherein an intersecting angle between the pair of fine metal wires in the intersection portion is a right angle.

3. The conductive member for a touch panel according to claim 1,
    wherein a starting point of bending in the bending portion is positioned at a distance of less than 1/10 a length of a corresponding side of the modified rhombus from the intersection portion.

4. The conductive member for a touch panel according to claim 1,
    wherein the bending portion has a linear shape or a curved shape.

5. The conductive member for a touch panel according to claim 1,
    wherein the pair of fine metal wires are disposed on the same surface of the transparent insulating substrate and are electrically connected to each other in the intersection portion.

6. The conductive member for a touch panel according to claim 1,
    wherein the pair of fine metal wires are disposed on different surfaces of the transparent insulating substrate and are electrically insulated from each other in the intersection portion.

7. The conductive member for a touch panel according to claim 6,
    wherein the conductive layer includes a first conductive layer and a second conductive layer, the first conductive layer being disposed on one surface of the transparent insulating substrate, and the second conductive layer being disposed on the first conductive layer with an insulating layer interposed between the second conductive layer and the first conductive layer, and among the pair of fine metal wires, one fine metal wire is disposed on the first conductive layer and the other fine metal wire is disposed on the second conductive layer.

8. The conductive member for a touch panel according to claim 6, wherein the conductive layer includes a first conductive layer and a second conductive layer, the first conductive layer being disposed on one surface of the transparent insulating substrate, and the second conductive layer being disposed on another surface of the transparent insulating substrate, and among the pair of fine metal wires, one fine metal wire is disposed on the first conductive layer and the other fine metal wire is disposed on the second conductive layer.

9. The conductive member for a touch panel according to claim 1, wherein a line width of the fine metal wire is 1 μm or more and 3 μm or less.

10. A touch panel comprising the conductive member for a touch panel according to claim 1.

11. A conductive member for a touch panel according to claim 1, wherein the at least one fine metal wire among the pair of fine metal wires has only a single bending portion on each side of an intersection portion where the pair of fine metal wires intersect each other, where the single bending portion is bent to the inner side of the acute angle toward the intersection portion.

* * * * *